(12) United States Patent
Skovby

(10) Patent No.: US 12,228,173 B2
(45) Date of Patent: Feb. 18, 2025

(54) BEARING FOR LINEAR GUIDE RAIL

(71) Applicant: LEGO A/S, Billund (DK)

(72) Inventor: Klaus Skovby, Billund (DK)

(73) Assignee: LEGO A/S, Billund (DK)

( * ) Notice: Subject to any disclaimer, the term of this patent is extended or adjusted under 35 U.S.C. 154(b) by 213 days.

(21) Appl. No.: 17/796,987

(22) PCT Filed: Feb. 8, 2021

(86) PCT No.: PCT/EP2021/052922
§ 371 (c)(1),
(2) Date: Aug. 2, 2022

(87) PCT Pub. No.: WO2021/156500
PCT Pub. Date: Aug. 12, 2021

(65) Prior Publication Data
US 2023/0055207 A1 Feb. 23, 2023

(30) Foreign Application Priority Data
Feb. 6, 2020 (DK) .............................. PA202070076

(51) Int. Cl.
*B29C 45/26* (2006.01)
*B29C 33/30* (2006.01)
*F16C 29/02* (2006.01)

(52) U.S. Cl.
CPC ............ *F16C 29/02* (2013.01); *B29C 33/303* (2013.01); *B29C 45/2606* (2013.01)

(58) Field of Classification Search
CPC ........................... B29C 33/303; B29C 45/2606
See application file for complete search history.

(56) References Cited

U.S. PATENT DOCUMENTS

| 3,389,625 A | 6/1968 | Wagner |
| 4,515,415 A | 5/1985 | Szenger |

(Continued)

FOREIGN PATENT DOCUMENTS

| CN | 202985844 U | 6/2013 |
| CN | 203937071 U | 11/2014 |

(Continued)

OTHER PUBLICATIONS

CN Notice of Allowance corresponding to U.S. Appl. No. 17/796,987, dated Oct. 17, 2023, 5 pages.

(Continued)

*Primary Examiner* — Timothy Kennedy
(74) *Attorney, Agent, or Firm* — Day Pitney LLP; George Chaclas; Anthony A. Kassas

(57) ABSTRACT

A mold box containing a bearing assembly arranged between the guide surfaces of a guide rail pillar. The bearing assembly has a bearing element that contains a main body art capable of receiving the guide rail pillar. The bearing element also has a first bearing surface and a second bearing surface that can be arranged in a common plane, parallel to the planar guide surfaces and spaced apart in the direction of the longitudinal axis. The first and second bearing surfaces are separated by an intermediary surface portion that is retracted from the common plane. Cavities formed in the bearing element are located below each of the first and second bearing surfaces, such the bearing element is provided with a resilience relative to the main body part.

15 Claims, 15 Drawing Sheets

(56) References Cited

U.S. PATENT DOCUMENTS

| | | | |
|---|---|---|---|
| 4,718,845 A | 1/1988 | Sheffield et al. | |
| 4,746,393 A * | 5/1988 | Ephere | D04H 3/073 156/173 |
| 4,750,876 A | 6/1988 | Lawson | |
| 4,884,962 A | 12/1989 | Sheffield | |
| 4,941,758 A | 7/1990 | Osawa | |
| 5,547,367 A | 8/1996 | Stein | |
| 5,788,903 A | 8/1998 | Allgaier | |
| 6,203,312 B1 | 3/2001 | Romi | |
| 2003/0138513 A1 | 7/2003 | Matsuura et al. | |
| 2004/0013765 A1 | 1/2004 | Kruger et al. | |
| 2004/0076353 A1 | 4/2004 | Kubota et al. | |
| 2006/0233474 A1 | 10/2006 | Naruse et al. | |
| 2007/0172539 A1 | 7/2007 | Wang et al. | |
| 2007/0210534 A1 | 9/2007 | Thibault et al. | |
| 2009/0130244 A1 | 5/2009 | Clarke | |
| 2009/0220631 A1 | 9/2009 | Bokich | |
| 2010/0001436 A1 | 1/2010 | Axelsson | |
| 2011/0254396 A1 | 10/2011 | Evans | |
| 2012/0269917 A1 | 10/2012 | Miyatake et al. | |
| 2014/0106022 A1 | 4/2014 | Navarra | |
| 2014/0175690 A1 | 6/2014 | Sudermann | |

FOREIGN PATENT DOCUMENTS

| | | |
|---|---|---|
| CN | 104246252 A | 12/2014 |
| CN | 104512008 A | 4/2015 |
| CN | 104526997 A | 4/2015 |
| CN | 105196479 A | 12/2015 |
| CN | 108099141 A | 6/2018 |
| CN | 109312778 A | 2/2019 |
| CN | 109352904 A | 2/2019 |
| CN | 110267719 A | 9/2019 |
| DE | 3924182 C1 | 5/1990 |
| DE | 29614378 U1 | 11/1996 |
| DE | 19627176 A1 | 1/1998 |
| DE | 29802231 U1 | 4/1998 |
| DE | 19952142 A1 | 5/2000 |
| DE | 202004012169 U1 | 8/2005 |
| DE | 102006046528 A | 4/2008 |
| DE | 102011075324 A1 | 11/2012 |
| DE | 102011080452 A1 | 2/2013 |
| DE | 202018107023 U1 | 3/2020 |
| EP | 0687541 A1 | 12/1995 |
| EP | 0856391 A1 | 8/1998 |
| EP | 1468807 A1 | 10/2004 |
| EP | 2607044 A2 | 6/2013 |
| FR | 2952576 A1 | 5/2011 |
| GB | 578318 A | 6/1946 |
| GB | 837640 A | 6/1960 |
| GB | 2030847 A1 | 4/1980 |
| GB | 2283936 A1 | 5/1995 |
| JP | S543155 A | 1/1979 |
| JP | H03239807 A | 10/1991 |
| JP | H0524067 A | 2/1993 |
| JP | H0646925 U | 6/1994 |
| JP | H07156232 A | 6/1995 |
| JP | H07246622 A2 | 9/1995 |
| JP | H08281746 A | 10/1996 |
| JP | H10305465 A | 11/1998 |
| JP | 2002-321222 A2 | 11/2002 |
| JP | 2006327131 A | 12/2006 |
| JP | 2007130940 A | 5/2007 |
| JP | 2010038349 A2 | 2/2010 |
| JP | 2011-245829 A | 12/2011 |
| JP | 2014134231 A2 | 7/2014 |
| JP | 2018030269 A2 | 3/2018 |
| KR | 19990025827 A | 4/1999 |
| KR | 20070039781 A | 4/2007 |
| WO | 2007039767 A1 | 4/2007 |
| WO | 2007063375 A1 | 6/2007 |

OTHER PUBLICATIONS

International Search Report in corresponding Application No. PCT/EP2021/052922, mailed May 11, 2021, 3 pages.
DK Search Report in Application No. PA 2020 70075, dated Jan. 2019, 4 pages.
DK Search Report in Application No. PA 2020 70076, dated Jan. 2019, 4 pages.
DK Search Report in Application No. PA 2020 70463, dated Jan. 2019, 4 pages.
International Preliminary Report on Patentability corresponding to Application No. PCT/EP2021/052924, mailed Apr. 12, 2022, 32 pages.
International Search Report in corresponding Application No. PCT/EP2021/052924, mailed May 11, 2021, 2 pages.
CN Office Action corresponding to U.S. Appl. No. 17/796,987, dated Sep. 14, 2023, 8 pages.
CN Office Action corresponding to U.S. Appl. No. 17/796,982, dated Oct. 11, 2023, 8 pages (translation unavailable).

* cited by examiner

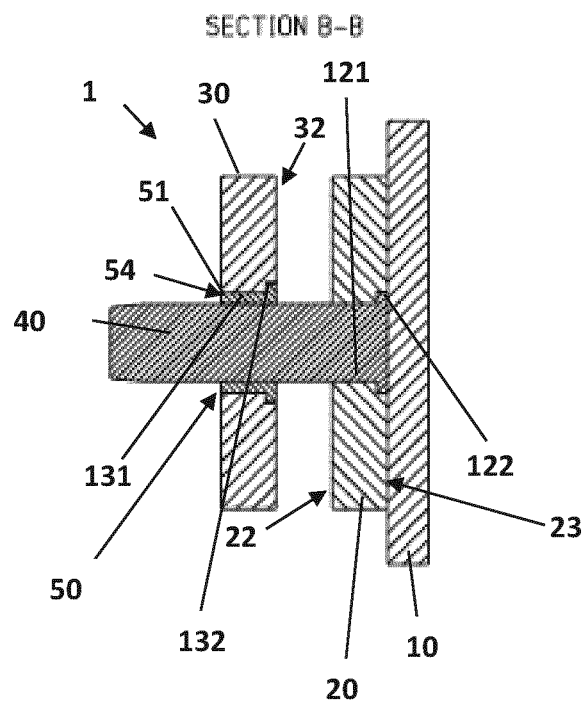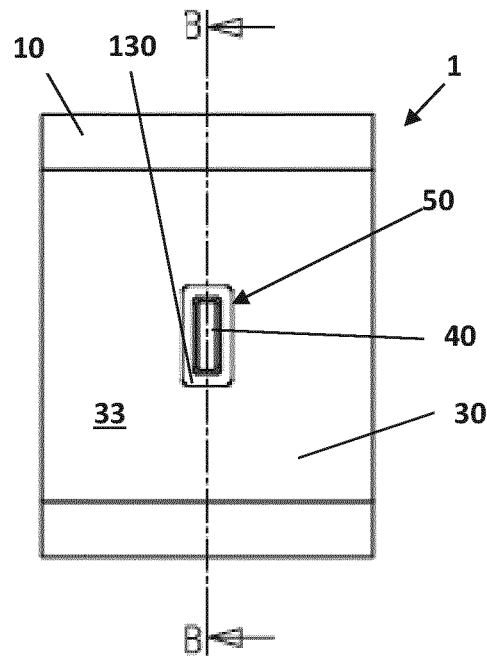
Fig. 4C
Fig. 4B
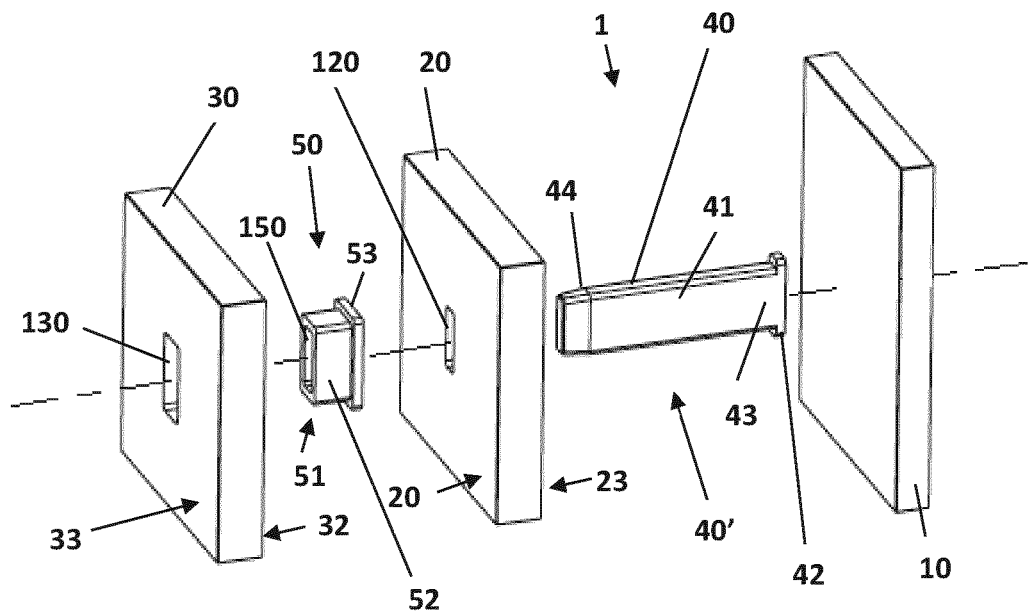
Fig. 5

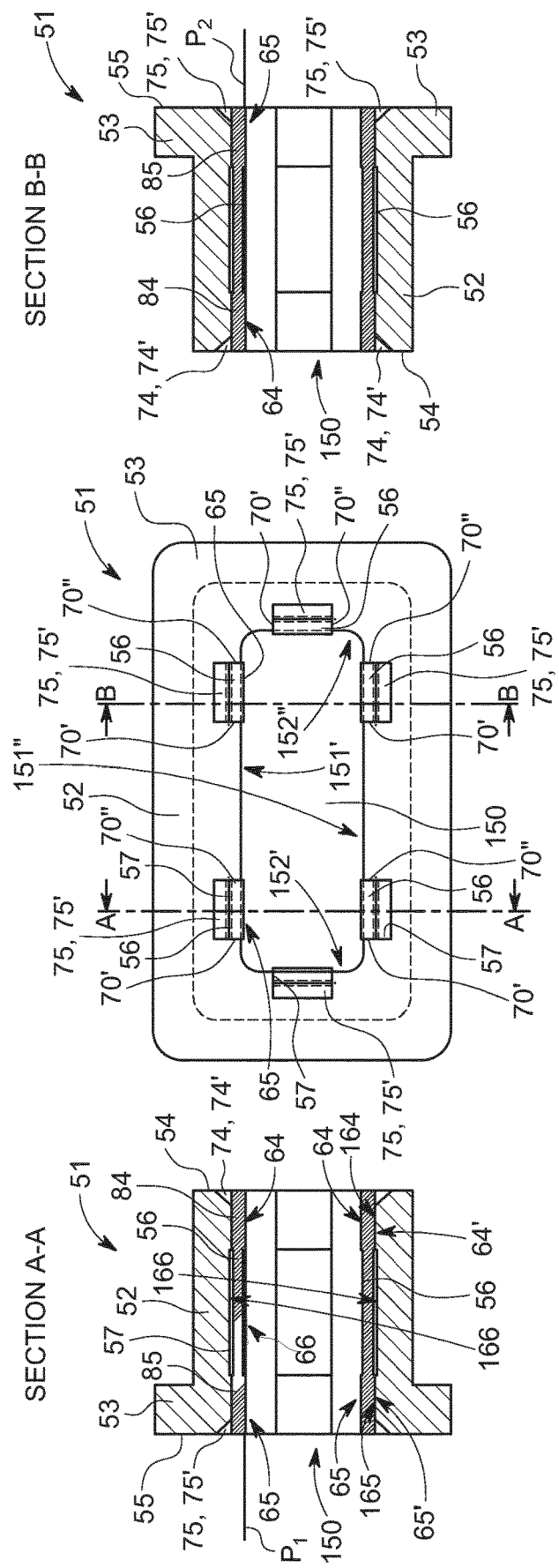

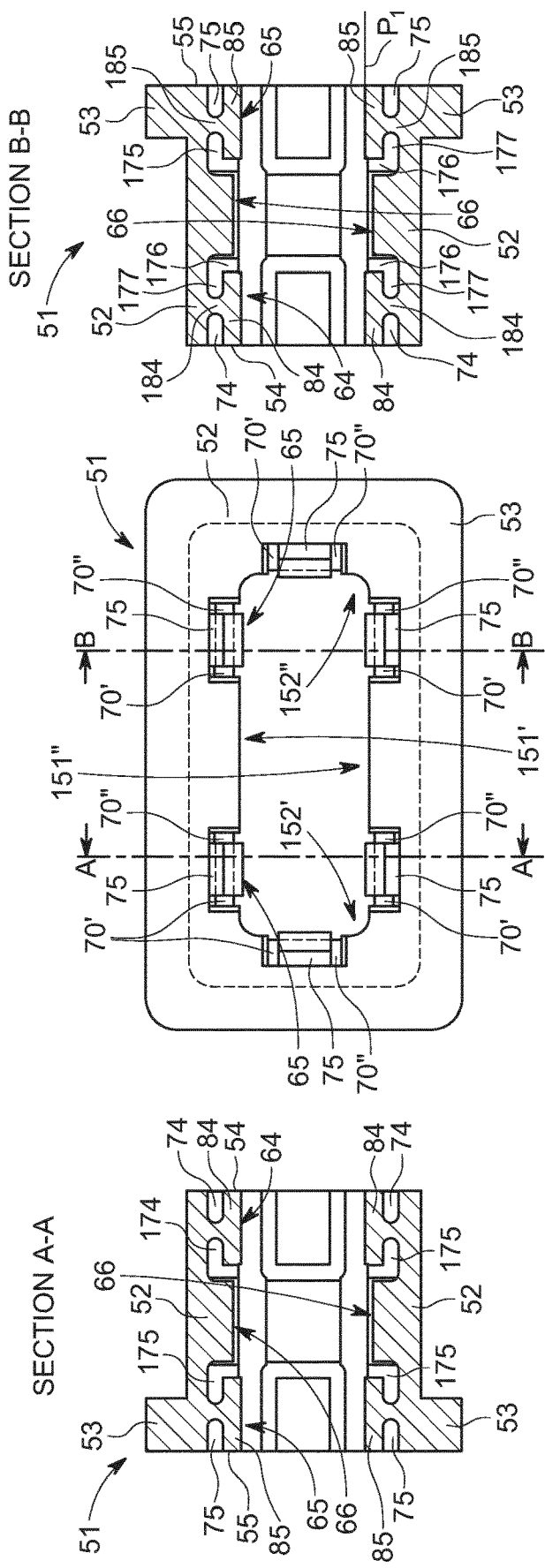

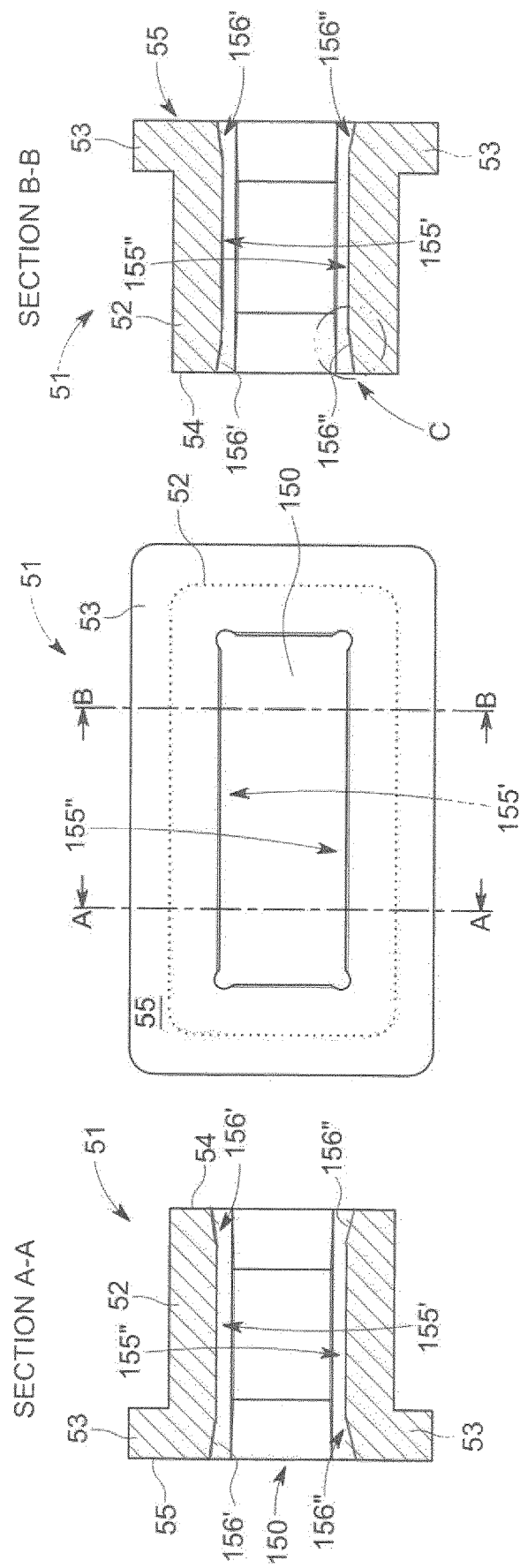

BEARING FOR LINEAR GUIDE RAIL

CROSS-REFERENCE TO RELATED APPLICATIONS

The present application claims priority to Danish Patent Application No. PA202070076 dated Feb. 6, 2020, and is a U.S. national stage application under 35 U.S.C. 371 of co-pending International Application No. PCT/EP2021/052922 filed on Feb. 8, 2021, the contents of each are incorporated by reference herein in their entirety for all purposes.

FIELD OF THE DISCLOSURE

The present disclosure relates to a bearing, and more particularly to a bearing for linear guide rails of mold boxes used in injection molding processes.

BACKGROUND

Injection molding machines comprises an injection unit and a clamping unit for operating a mold box. In injection molding machines, mold boxes typically comprise two mold half plates, or simply mold plates, arranged moveably relative to each other and guided by a set of guide rails. A clamping unit further comprises an actuator in the form of a linear drive mechanism for pressing at least one of the mold plates against one or more other mold plates, during injection of molten plastic performed by the injection unit. Typically, one mold plate is fixed relative to an injection molding machine and the set of guide rails, and the other mold plate is slideable along the set of guide rails. Four cylindrical guide rails are commonly arranged in parallel and intersecting the four corners of the half plates. An actuator, the linear drive mechanism, drives the sliding of moveable half-plate/mold plate along the set of guide rails, between a position, where the half-plates closes to form a mold, and a position, where the half-plates are separated from each other, so that a molded item may be removed from the mold box.

The use of a set of four cylindrical guide rails, or main guide rail pillars, provides for making a very stable construction. It is however a disadvantage that such mold box constructions are very complicated and expensive to manufacture due to the high precision needed for making the half-plates/mold plates slide on the set of parallel guide rails, driving tight tolerance demands. Further, during use mold boxes are subject to uneven temperature distribution, causing uneven wear on the mold box parts. It is also a problem that the guide rails makes it difficult to design for auxiliary functions for example ejection pins, extraction arms etc.

Bearings for cylindrical guide rails are well known. However, providing a bearing for a planar surface presents some unexpected trouble. A bearing needs to have a certain contact area. However, contact between planar surfaces of a guide rail as proposed and entirely planar bearing surface of a bearing element will result in problems at the edges, where the contact surface ends. When the guide rail and/or the half plate (mold plate) moving on the guide rail is subjected to uneven load distribution causing torsional forces, such an edge will cause increased wear on the guide rail/and or the bearing. In theory, such an effect may be alleviated by "rounding" the edge, or at least making a ledge in an angle to the bearing surface.

However, if the stability of the contact in the bearing is to be maintained, it is necessary to provide such a rounding with a very small angle. It is expected that over the width of a typical half plate, it is not possible to make such a low angle rounding. This could in theory be alleviated by increasing the length of the bearing, e.g., by increasing the thickness off the half plates/mold plates. However, this would be undesirably at least for space saving reasons.

Another problem, which would not be solved even with an increased length of the bearing, is that—in practice—it is generally very difficult to make a small angle "rounding" without introducing a (microscopic) edge between the planar surface and the rounded surface of the bearing. Even such a very small edge may break the oil film on thee bearing surfaces and increase wear or cause the bearing surfaces to lock.

Therefore, there is a need for an alternative bearing for polygonal cross section guide rails for mold boxes.

SUMMARY

It is therefore an object of the disclosure to solve the disadvantages of the prior art systems, and to increase the variety of options.

The objects of the disclosure are—in a first aspect of the disclosure obtained by a bearing between planar guide surfaces of a guide rail pillar of a mold box and a mold plate of the mold box, the mold plate being moveably arranged on the guide rail, the guide rail having a longitudinal axis, the bearing comprising a bearing element, wherein the bearing element has a main body part with a first end and a second end and a through-going opening for receiving said guide rail pillar, the through-going opening extending from said first end to said second end through said body part, and the through-going opening having one inner surface for each planar guide surface of the guide rail pillar, wherein, for at least one of the guide surfaces of the guide rail pillar, the bearing element comprises a first planar bearing surface and a second planar bearing surface arranged in a common plane and parallel to the planar guide surface, and spaced apart in the direction of the longitudinal axis, the first bearing surface arranged at the first end and the second bearing surface arranged at the second end of the bearing element, wherein the first and second bearing surfaces are elevated above the corresponding inner surface of the through-going opening, wherein the first and second bearing surfaces are separated by an intermediary surface portion being retracted from the common plane of the two bearing surfaces, and wherein, below each of the first and second bearing surfaces, a cavity is formed in the bearing element, such that a portion of the bearing element is provided with a resilience relative to the main body part of the bearing element.

Preferably, the bearing element comprises two planar bearing surfaces arranged as described above for each inner surface of the through-going opening.

The cavity below (under) the first bearing surface allows the portion (on which the first bearing surface is formed) to flex relative to the main body part proper, thereby providing the mentioned resilience. Similarly, the cavity below the second bearing surface allows the portion (on which the second bearing surface is formed) to flex relative to the main body part proper, thereby providing the mentioned resilience.

In an embodiment the cavity below the first bearing surface comprises a primary cavity extending into the main body part of the bearing element from an end surface at the first end, and wherein the cavity below the second bearing surface comprises a primary cavity extending into the main body part of the bearing element from an end surface at the second end.

In a further embodiment the cavity below each of the first and second bearing surfaces is formed as a ledge.

The ledges' may be formed with surfaces angled relative to the inner surface.

In a further embodiment the first and the second bearing surfaces and the intermediary surface portion are formed on a detachable plate member,
wherein the detachable plate member is arranged in an elongate depression formed in the inner surface of the through-going opening through the bearing element, which elongate depression extends from said first end to said second end of the bearing element.

In this embodiment, the portions of the bearing element provided with a resilience relative to the main body part by the cavities formed in the bearing element form part of the detachable plate member.

The reverse side of the detachable plate member, relative to the first and the second bearing surfaces may be formed with a single planar surface. In other embodiments however, the detachable plate member, on a reverse side relative to the first and the second bearing surfaces comprises
a first abutment surface;
a second abutment surface; and
an intermediary surface portion being retracted from a common plane of the two abutment surfaces.

In a further embodiment, the elongate depression formed in the inner surface of the through-going opening through the bearing element comprises
a first abutment plateau at the second first end of the bearing element;
a second abutment plateau at the second end of the bearing element, and
an intermediary depression formed between the first and second abutment plateaus.

Thus, in embodiments where the elongate depression formed in the inner surface is formed with an even bottomed surface, the retracted surface portion forms a void or space between the even bottomed surface and the detachable plate member, thereby increasing the flexibility of the bearing.

In embodiments, where the elongate depression formed in the inner surface is formed with the first and second abutment plateaus separated by the intermediary depression, and the reverse side of the detachable plate member, relative to the first and the second bearing surfaces is formed with a single planar surface, a similar void or space is formed between the single planar surface of the detachable plate member and the intermediary depression between the abutment plateaus whereby a similar increased flexibility of the bearing may achieved.

In embodiments, where the elongate depression formed in the inner surface is formed with the first and second abutment plateaus separated by the intermediary depression, and where the reverse side of the detachable plate member, relative to the first and the second bearing surfaces, is formed with retracted surface portion between the first and second abutment surfaces, an increased size void or space is formed between the elongate depression and the detachable plate member, whereby an increased flexibility of the bearing may achieved.

It is noted that in embodiments, where the elongate depression formed in the inner surface is formed with the first and second abutment plateaus separated by the intermediary depression, and where the reverse side of the detachable plate member, relative to the first and the second bearing surfaces, is formed with retracted surface portion between the first and second abutment surfaces, the abutment surfaces and the abutment plateaus re configured for abutting on each other.

Not shown locking means may keep the detachable plate member locked in the correct position in the elongate depression 57.

In a further embodiment, the cavity below the first bearing surface comprises a secondary cavity extending into the main body part of the bearing element from the inner surface of the through-going opening from a position adjacent to the first bearing surface; and
wherein the cavity below the second bearing surface comprises a secondary cavity extending into the main body part of the bearing element from the inner surface of the through-going opening from a position adjacent to the second bearing surface.

In an embodiment hereof the secondary cavity adjacent to the first bearing surface and the secondary cavity adjacent to the second bearing surface each comprise one first cavity portion extending in a direction perpendicular to a plane of the inner surface of the through-going opening and one second cavity portion extending from the first cavity portion in a direction parallel to the inner surface of the through-going opening.

In a further embodiment, the portions of the bearing element provided with a resilience relative to the main body part by the cavities formed in the bearing element are formed integral with the main body part of the bearing element.

For example the main body part of the bearing element may be formed in one piece and the cavity portions may be shaped by milling the cavity in the main body part. In other embodiments, the bearing element may be formed in one piece in an additive manufacturing process.

In such embodiments, the cavity forms a bridge between the main body part as such and the portion on which the first bearing surface is formed. This bridge thereby has a diminished material thickness, which will provide a desired resilience. Similarly, the cavity forms a bridge between the main body part as such and the portion on which the second bearing surface is formed.

In a further embodiment, wherein two separations are provided in the bearing element adjacent to each of the first and the second bearing surface, the separations extending along a direction parallel to the longitudinal axis, and in an entire length of the bearing surface, and the separations extending from the inner surface of the through-going opening into the main body part.

In embodiments thereof, where the portions of the bearing element provided with a resilience relative to the main body part by the cavities formed in the bearing element are formed integral with the main body part of the bearing element the main body part of the bearing element may be formed in one piece and the portions may be shaped by milling the cavity and/or the separations in the main body part.

In further embodiment, the guide rail pillar comprises two parallel planar guide surfaces and where the bearing element comprise two opposed parallel inner surfaces corresponding to the two parallel planar guide surfaces, and where each of the two opposed parallel inner surfaces comprises at least one set of first and second bearing surfaces.

In further embodiment, the guide rail pillar comprises a first two parallel planar guide surfaces and a second two parallel planar guide surfaces perpendicular to the first two parallel planar guide surfaces, and where the bearing element comprise a first two opposed parallel inner surfaces corresponding to the first two parallel planar guide surfaces, and a second two opposed parallel inner surfaces corresponding to the second two parallel planar guide surfaces, and where each of the parallel inner surfaces comprises at least one set of first and second bearing surfaces.

In a further embodiment, the bearing element is arranged in an opening through the moveable mold plate of the mold box.

The objects of the disclosure may—in a second aspect—be obtained by a mold box for an injection molding machine, the mold box comprising
a first mold plate;
a second mold plate movably arranged relative to the first mold plate; and
a guide rail system configured for guiding the second mold plate linearly away from and towards the first mold plate,
wherein the guide rail system comprises a guide rail pillar,
wherein the guide rail pillar has a longitudinal axis and a cross sectional shape perpendicular the longitudinal axis, and wherein the cross-section forms a polygon,
wherein the guide rail pillar comprises planar guide surfaces equivalent to the number of sides in the polygonal cross-sectional shape of the guide rail pillar; and
wherein a bearing according to any one of the embodiments of the first aspect described above, is arranged between the planar guide surfaces of the guide rail pillar and the second mold plate.

In an embodiment also the first mold plate may be moveably arranged on the guide rail pillar wherein a bearing according to any one of the embodiments of the first aspect described above, is arranged between the planar guide surfaces of the guide rail pillar and the first mold plate.

In further embodiments, the guide rail system comprises a single guide rail pillar only.

In a further embodiment, the single guide rail pillar extends through a second opening in the second mold plate and first opening in a first mold plate and further, the second opening in the second mold plate is formed centrally in the second mold plate and the first opening in the first mold plate is formed centrally in the first mold plate.

In a third aspect of the disclosure the objects may be obtained by an injection molding machine comprising a mold box according to the first aspect of the disclosure.

More particularly, in the third aspect, the objects of the disclosure are achieved by an injection molding machine comprising
a mold box comprising a first mold plate and a moveable second mold plate;
a linear drive mechanism for moving the second mold plate; and
an injection unit,
the mold box further comprising
a base plate connected to the frame of the injection machine and to the first mold plate; and
a guide rail system configured for guiding the second mold plate linearly away from and towards the first mold plate,
wherein the second mold plate is movably arranged relative to the first mold plate, and driven by the linear drive mechanism,
wherein the guide rail system comprises a guide rail pillar,
wherein the guide rail pillar has a longitudinal axis and a cross section perpendicular the longitudinal axis, where the cross-section forms a polygon;
wherein the guide rail pillar comprises planar guide surfaces equivalent to the number of sides in the polygonal cross-sectional shape of the guide rail pillar; and
wherein a bearing according to any one of the embodiments of the first aspect described above is arranged between the planar guide surfaces of the guide rail pillar and the second mold plate.

In an embodiment also the first mold plate may be moveably arranged on the guide rail pillar wherein a bearing according to any one of the embodiments of the first aspect described above, is arranged between the planar guide surfaces of the guide rail pillar and the first mold plate.

In further embodiments, the guide rail system comprises a single guide rail pillar only.

In a further embodiment, the single guide rail pillar extends through a second opening in the second mold plate and first opening in a first mold plate and further, the second opening in the second mold plate is formed centrally in the second mold plate and the first opening in the first mold plate is formed centrally in the first mold plate.

Above, and in the following, when referring to a guide rail system, a guide rail or guide rail pillar, reference may be made to any guide system, positioning system or alignment system of a mold box, a clamping unit or an injection molding machine. However, a preferred use of the bearing is with polygonal cross-shape main guide rail pillars, i.e. the main guide rail system of a mold box, a clamping unit or an injection molding machine. Main guide rail pillars, having a first end and a second, where the first end of the main guide rail pillar is connected to a fixed base plate, where the base plate is connected to an immobile relative to a frame of the injection molding machine or at least a frame of the clamping unit of the injection molding machine. Further, the second end of the main guide pillar(s) is/are connected to a second end structure of a clamping unit, which second end structure may be a plate and is arranged at a second end of the clamping unit frame. Further the second end structure is connected to an immobile relative to a frame of the injection molding machine or at least a frame of the clamping unit of the injection molding machine.

A main guide rail system and any main guide rail pillars, thereof, are separate from any alignment system, and different therefrom.

It should be emphasized that the term "comprises/comprising/comprised of" when used in this specification is taken to specify the presence of stated features, integers, steps or components but does not preclude the presence or addition of one or more other features, integers, steps, components or groups thereof.

It should be appreciated that the subject technology can be implemented and utilized in numerous ways, including without limitation as a process, an apparatus, a system, a device, a method for applications now known and later developed. These and other unique features of the system disclosed herein will become more readily apparent from the following description and the accompanying drawings.

BRIEF DESCRIPTION OF THE DRAWINGS

In the following, the disclosure will be described in greater detail with reference to embodiments shown by the enclosed figures. It should be emphasized that the embodiments shown are used for example purposes only and should not be used to limit the scope of the disclosure.

FIG. 4B, in a front view, shows the mold box of FIG. 4A.

FIG. 4C, in a sectional side view, shows the mold box of FIGS. 4A and 4B.

FIG. 5, in an exploded perspective view, shows the mold box of FIGS. 3A-C and 4A-C.

FIG. 78, in a perspective view, shows a bearing plate part for the bearing element of FIG. 7A.

FIG. 9C in a rear view, shows the bearing element of FIG. 9A.

FIG. 9D shows a section A-A though the bearing element of FIG. 9C.

FIG. 9E shows a section B-B though the bearing element of FIG. 9C.

FIG. 10C, in a rear view, shows the bearing element of FIG. 10A.

FIG. 10D shows a section A-A though the bearing element of FIG. 10C.

FIG. 10E shows a section B-B though the bearing element of FIG. 10C.

DETAILED DESCRIPTION

Figure 1:
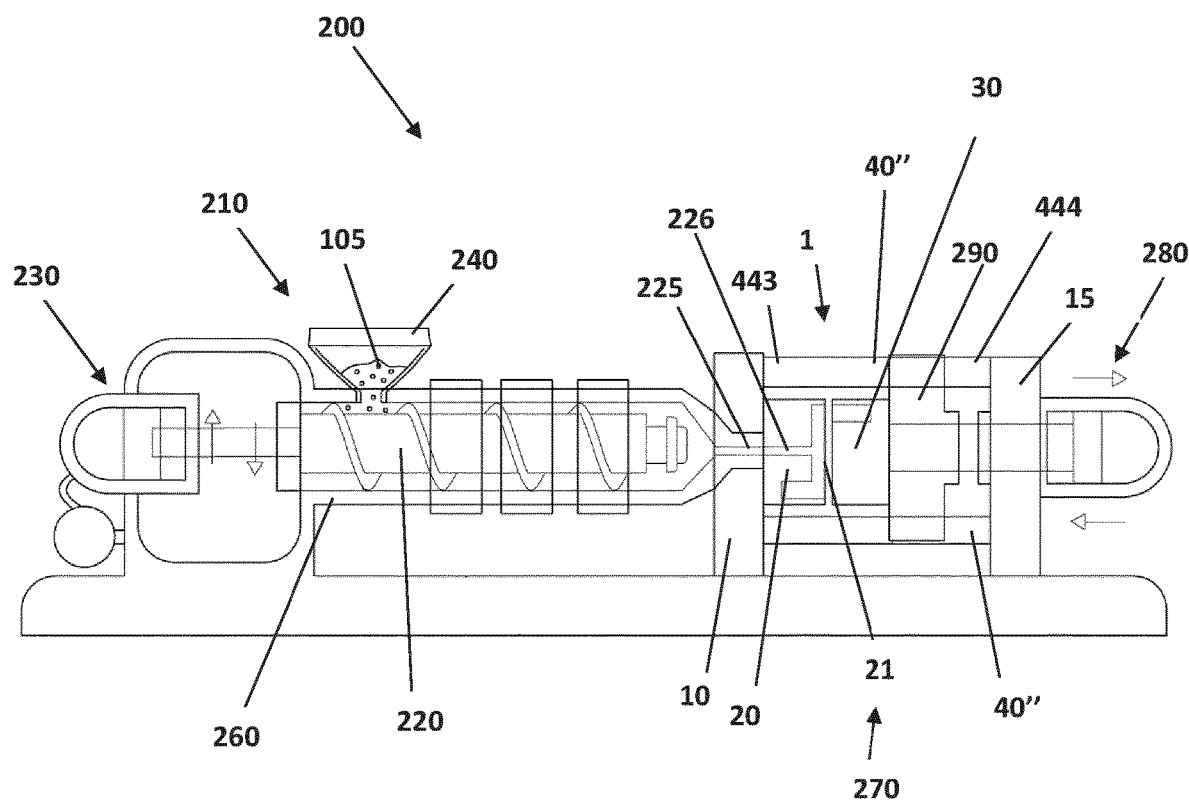
FIG. 1 schematically shows an outline of a prior art injection molding machine.

The subject technology overcomes many of the prior art problems associated with bearings for linear guide rails. The advantages, and other features of the technology disclosed herein, will become more readily apparent to those having ordinary skill in the art from the following detailed description of certain preferred embodiments taken in conjunction with the drawings which set forth representative embodiments of the present technology and wherein like reference numerals identify similar structural elements. Directional indications such as upward, downward, right, left and the like are used with respect to the figures and not meant in a limiting manner.

FIG. 1 illustrates schematically an injection molding machine 200 as known in the art. The injection molding machine 200 generally comprises an injection unit 210, shown in the left side of the figure, and a clamping unit 270, shown in the right side of the figure. The injection unit 210 handles injection of plastic material into a mold formed in the clamping unit 270 of the injection molding machine 200. The injection unit 210 and the clamping unit 270 of the injection molding machine 200 are attachable to a mount/frame 201.

Injection molding machines 200 generally works in the following way: Plastic granules 105 are fed into the barrel 260 of a reciprocating screw 220 of the injection unit 210 via a hopper 240. The reciprocating screw 220 is driven by a drive mechanism 230, such as an electrical motor. The plastic granules 105 fed through the hopper 240 are then transported towards the clamping unit 270 by the reciprocal screw, while being compacted and they are heated by heating devices 250 surrounding the reciprocating screw 220, until they melt and reach a suitable viscosity at a nozzle 225 at the entrance to the clamping unit 270 with the mold. The mold is formed in a mold box 1.

The fluid plastic material is fed from the nozzle 225 through sprue channels 226 in a base plate 10 of the mold box 1, and reaches a mold cavity 21 formed in a first mold plate 20 of the mold box 1. The first mold plate 20 of the mold box 1 is connected to the base plate 10. The base plate 10 is connected to the frame 201. A second mold plate 30 which may comprise a mold core and/or further portions of a mold cavity is arranged moveably relative to the first mold plate 20, such that the mold box 1 may be completely closed (clamped together) to allow injection of the melted plastic, and such that the mold box 1 may be opened to extracted a molded object 100 (see FIG. 2).

In FIG. 1, the second mold plate 30 is attached to a moveable platen 290. The moveable platen 290—and thereby the second mold plate 30—is slideably arranged on a set of cylindrical guide rails 40". Typically, the clamping unit 270 of injection molding machines 200 comprises four cylindrical guide rails 40" for guiding the movement of the moveable platen 290 with the second mold plate 30. The movement of the moveable platen 290 with the second mold plate 30 is performed by a linear drive mechanism 280, typically a hydraulic mechanism.

Still referring to FIG. 1, each of the (main) guide rail pillars 40" of the (main) guide rail system of the mold box 1 of the clamping unit 270 has an elongate body, which is cylindrical, and has a first end 443 and a second end 444. The first end 443 is fixed to the base plate 10, which is fixed to a frame (not shown) of the clamping device 270. The frame of the clamping unit 270 may form part of the frame 201 of the injection molding machine 200, or may be fixed thereto.

The opposite end, the second end 444, of the elongate body of each main guide rail pillars 40" is fixedly connected to a second end structure 15 of the clamping unit 270. The second end structure 15 of the clamping unit 270 is fixed to the frame (not shown) of the clamping device 270, which, as mentioned in the previous paragraph, may form part of the frame 201 of the injection molding machine 200, or may be fixed thereto.

The second end structure 15 may also, as shown in FIG. 1, form a mount for the linear drive mechanism 280.

Now, returning to the moveable platen 290 with the second mold plate 30 of FIG. 1, this moveable platen 290 comprises through-going slide bearings, or ball bearings, slidably receiving the cylindrical guide rails 40".

In an injection process, the linear drive mechanism 280 clamps the first mold plate 20 and the second mold plate 30 together, whereupon plastic is injected from the reciprocal screw 220 through the nozzle 225 and into the mold cavity 21. When the plastic has filled the mold cavity 21 completely, and has cooled sufficiently for the plastic to be in solid state, then the linear drive mechanism 280 moves the second mold plate 30 away from the first mold plate 20, and the molded object (not distinctly shown) is ejected from the mold cavity 21 in the first mold plate 20. The ejection of the molded object is typically done by ejector pins (not shown) formed in/through the base plate 10.

Figure 2:
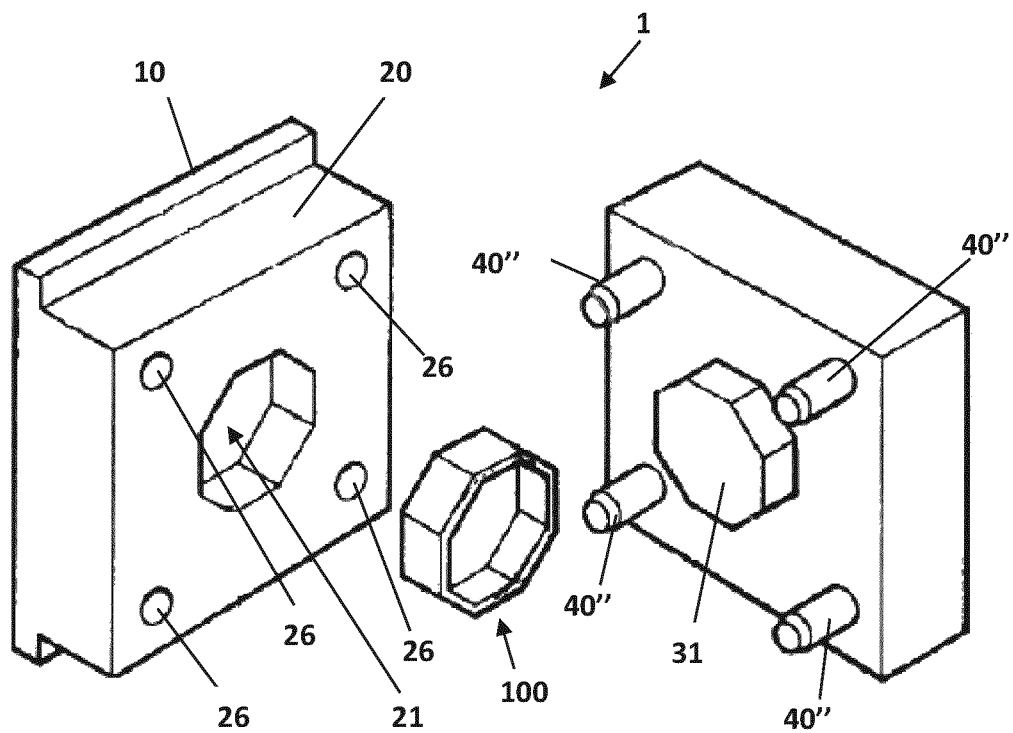
FIG. 2, in a perspective view, shows components of a prior art mold box with two half-plates and a set of cylindrical guide rails.

FIG. 2 shows a prior art mold box 1 for an injection molding machine 200 (as outlined in FIG. 1), and a molded object 100. The mold box 1 is shown in a separated state where the molded object 100 is visible between two half plates, or mold plates 20, 30 of the mold box 1. Thus, the mold box 1 comprises two mold plates 20, 30. A first mold plate 20, here shown to comprise a mold cavity 21 of a mold, is connected to a base plate 10 of the mold box 1. The first mold plate 20 and the base plate 10 may form one integrated part, or they may be formed as separate parts and joined subsequently by suitable means, e.g. bolts. A mold cavity 21 is formed as a depression in a surface of the first mold plate 20.

The first mold plate 20—via the base plate 10—can be connected to an injection molding machine 200, e.g. as described above. The base plate 10 may thus be connected to a frame 201 as shown in FIG. 1.

A second mold plate 30 is moveably arranged relative to the first mold plate 20 and the injection molding machine 200. The second mold plate 30 is slideably arranged on a set of guide rails 40" of a guide rail system configured for guiding the second mold plate 30 linearly away from and towards the first mold plate 20.

The set of guide rails 40" comprises four cylindrical guide rails 40". The guide rails 40" are arranged to slide over bearings (not shown) provided through the second mold plate 30. In FIG. 2 only a portion of the guide rails 40" is seen.

The guide rails 40" are fixedly secured in the openings 24 provided in the first mold plate 20. There is one opening 24 per guide rail 40".

In FIG. 2 the cylindrical guide rails 40" extend through openings through the second mold plate 30 itself, as opposed to the version shown in FIG. 1, where the second mold plate 30 is connected to a moveable platen 290, which has bearings for the guide rails 40".

The second mold plate 30 is shown with a core 31 configured for mating with the mold cavity 21 in the first mold plate 20 to form a shape corresponding to the molded object 100.

FIGS. 3-5 shows a mold box 1 according to an embodiment of the disclosure. The mold box 1 comprises a base plate 10 and a first mold plate 20 connected thereto. During use in injection molding processes, the first mold plate 20 is fixed in position relative to the base plate 10. The base plate 10 is fixedly connectable to an injection molding machine, e.g. as described in connection with the prior art injection molding machine 200 shown in FIG. 1. The first mold plate may comprise one or more mold cavities (not shown) formed as depressions in a first surface 22 of the first mold plate 20. An opposite side, second side 23 of the first mold plate 20 faces the base plate 10, see e.g. FIG. 5.

The first mold plate 20 may be formed integrally with the base plate 10, or it may—as shown in FIGS. 3-5—be formed as individual/separate parts and subsequently be joined/connected, such that the first mold plate 20 is fixed to the base plate 10 at least during the injection molding process. The first mold plate 20 may be connected to the base plate using for example bolts.

The one or more mold cavities 21 (not distinctly shown) may be formed in one or more cassettes attachable on, or insertable in suitable recesses in, the first surface 22 of the first mold plate 20.

Further, the first mold plate 20 and or the base plate 10 may be equipped with sprue channels and runner channels necessary to connect the one or more mold cavities 21 in the first mold plate 20 with an injection nozzle 225 of an injection molding machine 200, such as an injection molding machine as shown in FIG. 1.

The mold box 1 according to the disclosure—and as shown in FIGS. 3-5—further comprises a second mold plate 30.

The second mold plate 30 is movably arranged relative to the first mold plate 20. Thereby, the second mold plate 30 is also movably arranged relative to the base plate 10.

The mold box 1, according to the disclosure as shown in FIGS. 3-5, further comprises a guide rail system 40' configured for guiding the second mold plate linearly away from and towards the first mold plate 20.

The guide rail system 40' allows the second mold plate 30 to be movably arranged relative to the base plate 10.

In other not shown embodiments, the first mold plate 20 may also be movably arranged, relative to the base plate 10, the injection molding machine 200 further comprising means for moving the first base plate 20 on the guide rail system 40'.

In yet another embodiment, the mold box 1 may comprise a third plate (not shown) arranged between the first and second mold plates 20, 30, where for example runner channels are arranged in the third plate. Such a third plate may be fixed relative to the base plate 10 or it may be moveable on the guide rail system 40' in order to facilitate de shaping of the runner channels.

As shown in FIGS. 3-5, the guide rail system 40' comprises a single guide rail pillar 40. In principle, the guide rail system may 40' may comprise more than a single guide rail pillar, but only one is needed.

The guide rail pillar 40 is elongate, having a first end 43 and second end 44, an elongate body part 41 extending between the first end 43 and the second end 44, and a longitudinal axis A. The guide rail pillar 40 has a cross sectional shape perpendicular to the longitudinal axis A.

The cross-section/cross-sectional shape forms a polygon.

A polygon or polygonal shape is inclusive of any 2-dimensional shape formed with straight lines. Triangles, quadrilaterals, pentagons, and hexagons are all examples of polygons.

There are two main types of polygon—regular and irregular. A regular polygon has equal length sides with equal angles between each side. Any other polygon is an irregular polygon, which by definition has unequal length sides and unequal angles between sides. In principle, the cross-section of the guide pillar according to the disclosure may have any polygonal shape.

However, as shown in FIGS. 3-5, the polygonal shape may in some embodiments be rectangular.

In some embodiments a longer side length of the rectangular cross section/crass-sectional shape may be arranged vertically. Thus, the rectangular shape of the guide rail pillar 40 is oriented such that a longer side of the rectangular shape extends vertically and a shorter side of the rectangular shape extends horizontally.

In any case, the guide rail pillar 40 having a cross-section/cross-sectional shape forming a polygon will result in the guide rail pillar 40 having a set of planar guide surfaces 45', 45", 46', 46" for cooperating with a bearing element 51 arranged on the second mold plate 30. The number of planar guide surfaces on the guide rail pillar 40 will depend on the number of sides of the polygonal cross-section/cross-sectional shape of the guide rail pillar 40. The guide rail pillar 40 shown in FIGS. 3-5 having a rectangular cross section has two wider planar guide surfaces 45', 45" and two narrower planar guide surfaces 46', 46". The two wider planar guide surfaces 45', 45" are parallel to each other and formed on opposed sides of the guide rail pillar 40.

Similarly, the two narrower planar guide surfaces 46', 46" are parallel to each other and formed on opposed sides of the guide rail pillar 40, but perpendicular to the two wider planar guide surfaces 45', 45".

The second mold plate may comprise one or more mold cores (not shown) extending outward from a first surface 32 of the second mold plate 30, facing the first surface of the first mold plate 20. An opposite side, second surface 33 of the second mold plate 320 faces away from the first mold plate 20 and the base plate 10, see e.g. FIG. 5. The second mold plate 30 is arranged moveably relative to the first mold plate 20, such that the mold box may be completely closed (clamped together) to allow injection of the melted plastic, and such that the mold box 1 may be opened to extracted a molded object, e.g. similar to the molded object 100 shown in FIG. 2.

As is the case with the first mold plate 20, described above, one or more mold cores (not distinctly shown) and/or further portions of mold cavities may in further embodiments be formed in one or more cassettes attachable on or insertable in suitable recesses in the first surface 32 of the second mold plate 30.

As is the case with the prior art examples described above, the mold box 1 according to the disclosure may form part of a clamping unit 270 of an injection molding machine 200, in this case however with a single polygonal cross-section guide rail pillar 40 (instead of the four cylindrical guide rails 40", shown in FIG. 1) for guiding the movement of the second mold plate 30. The movement of the second mold plate 30 is performed by a linear drive mechanism 280, for example a hydraulic mechanism.

As shown in FIGS. 3-5, the guide rail pillar 40 extends through a second opening 130 in the second mold plate 30. The first opening 130 in the second mold plate 30 is a through-going opening extending all the way through the second mold plate 30.

The second opening 130 in the second mold plate 30 preferably has a cross sectional shape corresponding to the cross-sectional shape of the guide pillar 40 such that the guide pillar 40 may be slidably arranged therein.

Preferably, the second opening 130 in second mold plate 30 is provided with a bearing 50, such as a slide bearing. In this case the second opening 130 in the second mold plate 30 is configured to receive the bearing 50.

The bearing 50 comprises a bearing element 51 with inner surfaces configured for contacting the planar surfaces of the guide rail pillar 40. The bearing element 51 may as shown in e.g. FIG. 5 have a main body part 52 and flange 53 having a larger cross sectional extent than that of the main body part 51, see e.g. FIG. 5. In such cases the second opening 130 in the second mold plate 30 may comprise one first section 131 configured for receiving the main body part 52 of the bearing element 51, and another, second section 132 with a larger cross-sectional extend than the first section 131, and configured for receiving the flange 53 of the bearing element 51, see e.g. FIG. 4C.

As shown in FIGS. 3-5, the guide rail pillar 40 extends through a third opening 150 formed in the bearing 50. The third opening 150 in the bearing element 51 is a through-going opening extending all the way through the bearing element 51. The third opening 150 in the bearing element 51 preferably has a cross sectional shape corresponding to the cross-sectional shape of the guide pillar 40 such that the guide pillar 40 may be slidably arranged therein.

As shown in FIGS. 3-5, the guide rail pillar 40 also may extend through a first opening 120 in the first mold plate 20. The first opening 120 in the first mold plate 20 is a through-going opening extending all the way through the first mold plate 20. The first opening 120 in the first mold plate 20 preferably has a cross sectional shape corresponding to the cross-sectional shape of the guide pillar 40 such that the guide pillar 40 may be received and fixedly anchored.

The guide rail pillar 40 may have a main body part 41 and flange or protrusion 42 having a larger cross sectional extent than that of the main body part 41, see e.g. FIG. 5. In such cases, and as shown in e.g. FIG. 4C, the first opening 120 in the first mold plate 20 may comprise one first section 121 configured for receiving the main body part 41 of the guide rail pillar 40, and another, second section 122 with a larger cross-sectional extend than the first section 121, and configured for receiving the flange 42 of the guide rail pillar 40, see e.g. FIG. 4C. The guide rail pillar 40 at a first end 43 thereof may thereby be provided with a protrusion 41 configured for cooperating with an enlargement 121 of the second opening 120 in the first mold plate 20.

Thus, the guide rail pillar 40 is anchored in first opening 120 through the first mold plate 20.

In either case, and as shown in FIGS. 3-5, the second opening 130 in the second mold plate 30 is formed centrally in the second mold plate 30. In this case, it follows that the first opening 130 in the first mold plate 30 is also formed centrally in the second mold plate 30.

The one or more mold cavities may be formed around the first opening 130 in the first mold plate 20. Further, mating mold cores may be formed around the second opening in the movable, second mold plate 30.

Figure 3A:
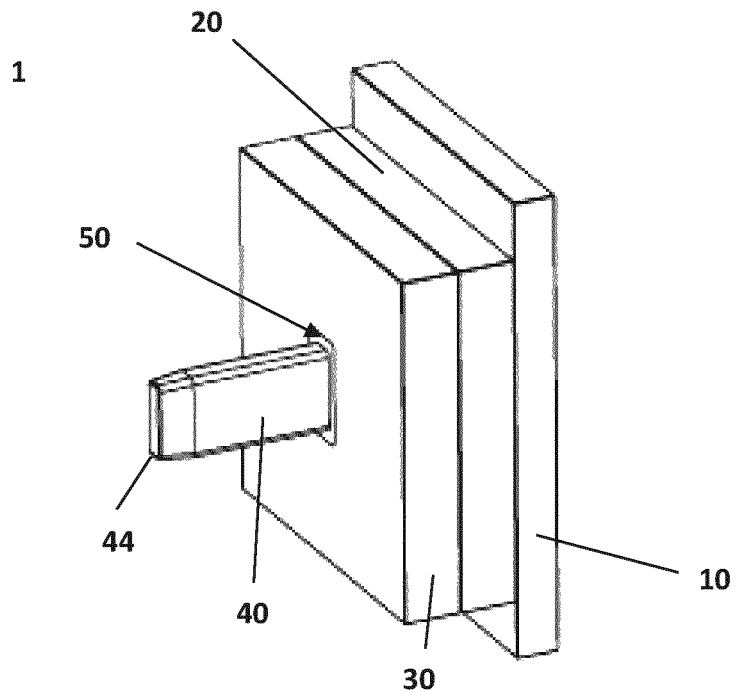
FIG. 3A, in a perspective view, shows a mold box according to one embodiment of the disclosure in a first position.
Figures 3B, 3C, 4A:
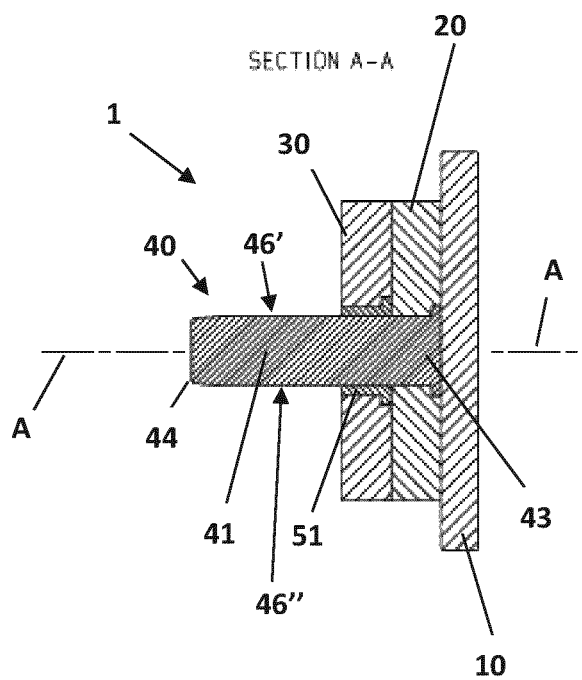
FIG. 3B, in a front view, shows the mold box of FIG. 3A in a sectional side view, shows the mold box of FIG. 3A.
FIG. 3C, in a sectional side view, shows the mold box of FIGS. 3A and 3B.
FIG. 4A, in a perspective view, shows the mold box of FIGS. 3A-C in a second position.

FIGS. 3A-C, in various views, show a mold box 1 according to one embodiment of the disclosure in a first position, where the first and second mold plates 20, 30 are in close contact and clamped together. This illustrates a position, where plastic may be injected into the mold cavity (not distinctly shown) formed between the first and second mold plates 20, 30. Correspondingly, FIGS. 4A-C show the mold box of FIGS. 3A-C in a second position, where the first and second mold plates 20, 30 are separated from each other. This illustrates a position, where molded objects may be removed from the mold cavity.

Figure 6A:
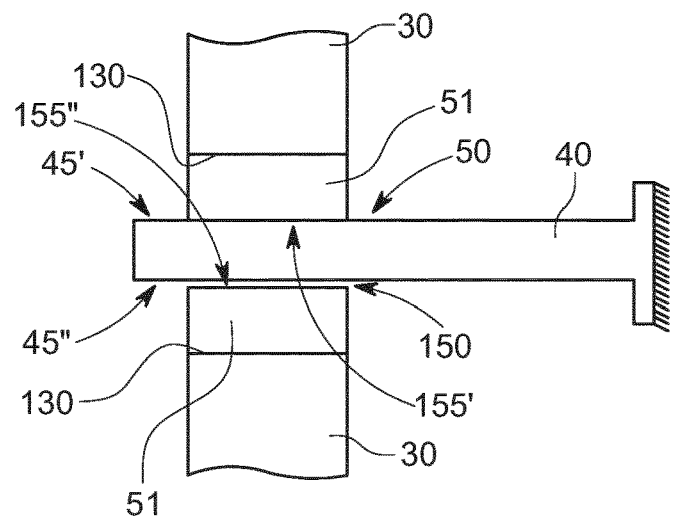
FIG. 6A, in a sectional view, shows a bearing between a guide rail with planar surfaces and a mold plate slidably arranged thereon, a bearing element arranged between the guide rail and the mold plate, in a situation where there are no torsional forces on the mold plate or the guide rail.
Figure 6B:
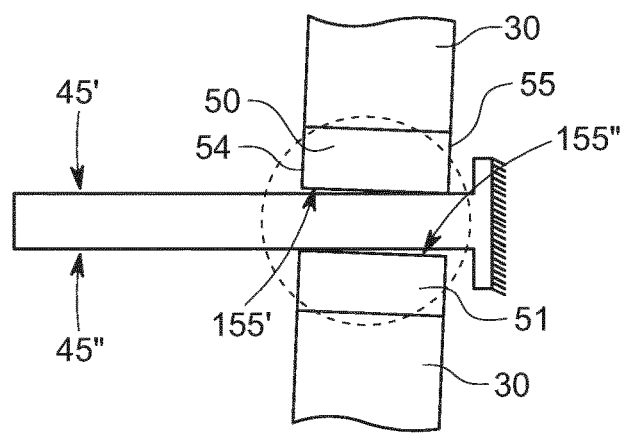
FIG. 6B shows the bearing of FIG. 6A in a situation where the guide rail or the mold plate is subjected to torsional forces.
Figure 6C:
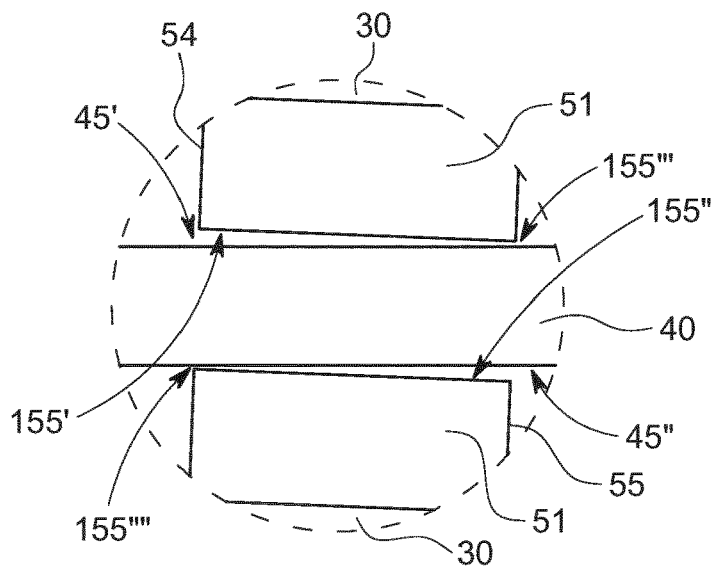
FIG. 6C, show detail of FIG. 68.

FIGS. 6A-C, in a sectional view, show a guide rail pillar 40 and a second mold plate 30 slidably arranged thereon. The guide rail pillar 40 is of the type described above, having a polygonal cross section (perpendicular to the elongate axis of the guide rail pillar 40), such as a square or rectangular cross section. Thus, as shown in FIGS. 6A-C, the guide rail pillar 40 has two planar guide surfaces 45', 45" arranged parallel to one another.

A bearing 50 is formed between the second mold plate 30 and the guide rail pillar 40. The bearing comprises a bearing element 51 arranged in a second opening 130 through the second mold plate 30 as described above. The bearing element 51 may be fixedly mounted in the second opening 130.

The bearing element 51 has a through-going opening, third opening 150, formed there through. The third opening 150 is shaped and sized to mate at least with the two planar guide surfaces 45, 45" of the guide rail pillar 40, and configured to allow the second mold plate 30 with the bearing element 51 to slide reciprocally and linearly on the guide rail pillar 40 in a direction parallel to the longitudinal direction of the guide rail pillar 40.

The third opening 150 for this purpose has two parallel internal bearing surfaces 155', 155". As shown in FIGS. 6A-C, the parallel internal bearing surfaces 155', 155" in this case are formed across the entire width of the bearing element 51 and the second mold plate 30. Theoretically, his would be beneficial to take up any torsional forces on the second mold plate during the molding process.

FIG. 6A shows a situation where there are no torsional forces on the second mold plate 30 or the guide rail pillar 40. However, especially if the mold box 1 guide rail system 40' has only a single guide rail pillar 40, there is a risk that an uneven pressure influences the second mold plate 30 relative to the guide rail pillar 40 such that the second mold plate 30 is forced to rotate slightly relative to the guide rail pillar 40. Such a situation is shown in FIG. 6B. The encircled area shown in dashed line in FIG. 6B is blown up in FIG. 6C. From FIG. 6C it is evident that torsion between the second mold plate and the guide rail pillar may result in two line contacts 155''', 155''''. Line contact increases contact pressure between the guide rail pillar 40 and the bearing element 51, and can cause the bearing 50 to lock, resulting in abrasive wear on both bearing element 51 and guide rail pillar 51. The bearing thus experiences both static loads and dynamic friction, making it difficult to design for optimum performance in all load cases.

As illustrated in FIGS. 10A-F, of which FIGS. 10A-E are not to scale, this problem may be overcome by removing a portion of material from the internal bearing surfaces 155'. 155" to form a ledge or "rounding" 156', 156" of the internal bearing surfaces 155'. 155", at each end of the third opening 150, i.e. in the longitudinal direction, A. The bearing element 51 shown in FIGS. 10A-F may substitute the bearing element 51 shown in FIGS. 6A-C or FIGS. 3-5. Such ledges 156', 156" will allow a slight rotation of the second mold plate 30 with the bearing element 51 relative to the corresponding parallel guide surfaces 45', 45" of the guide rail pillar 40 to accommodate for any asymmetrical loads on the second mold plate 30 to which the bearing element 51 is attached.

Figure 10A:
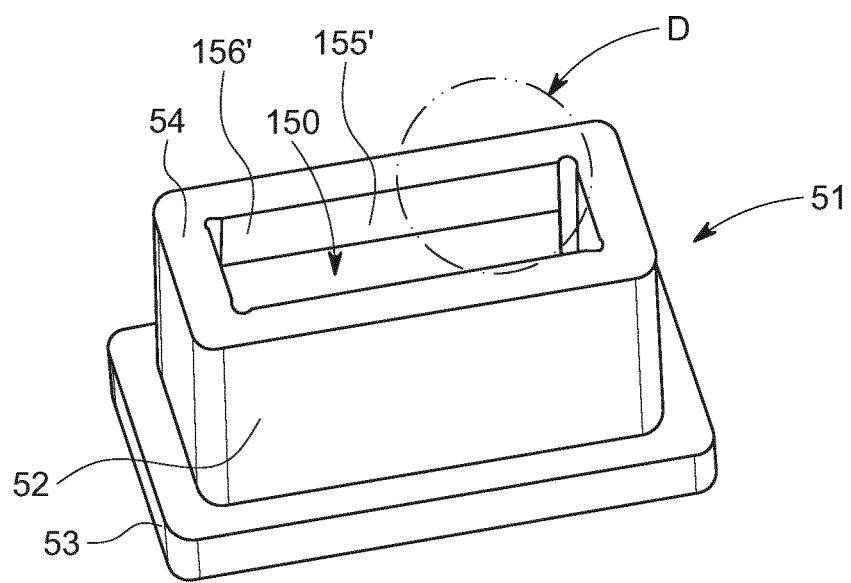
FIG. 10A, in a perspective view, shows a bearing element with profiled bearing surfaces for a bearing according to another aspect of the disclosure.
Figure 10B:
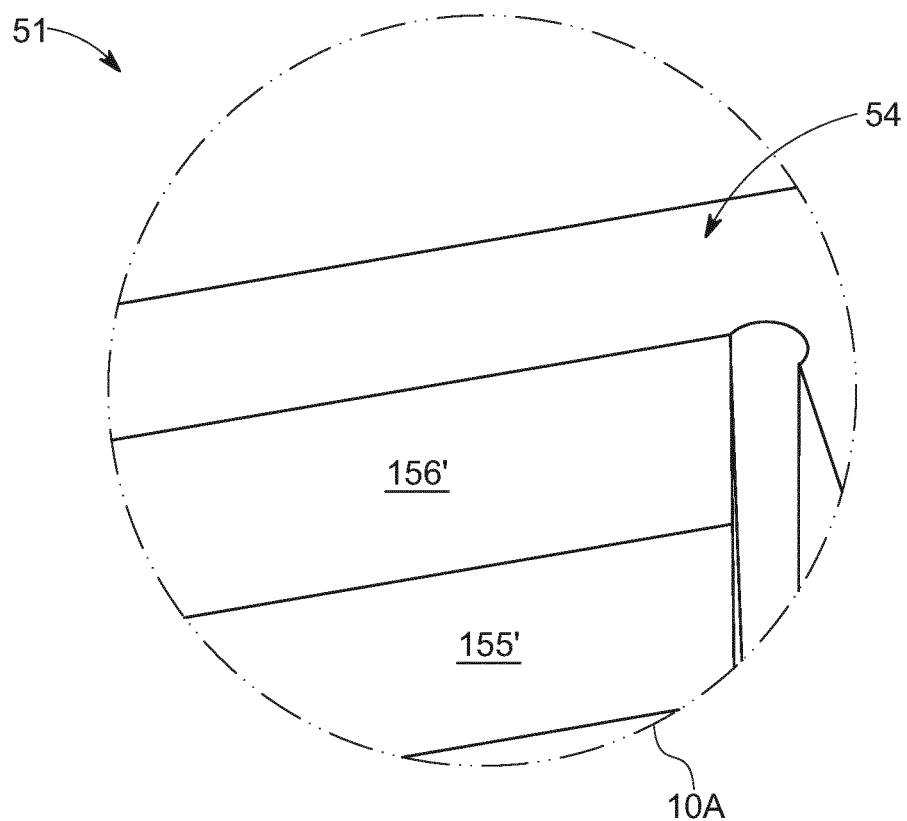
FIG. 10B shows a detailed view of one profiled bearing surface of the bearing element of FIG. 10A.
Figure 10F:
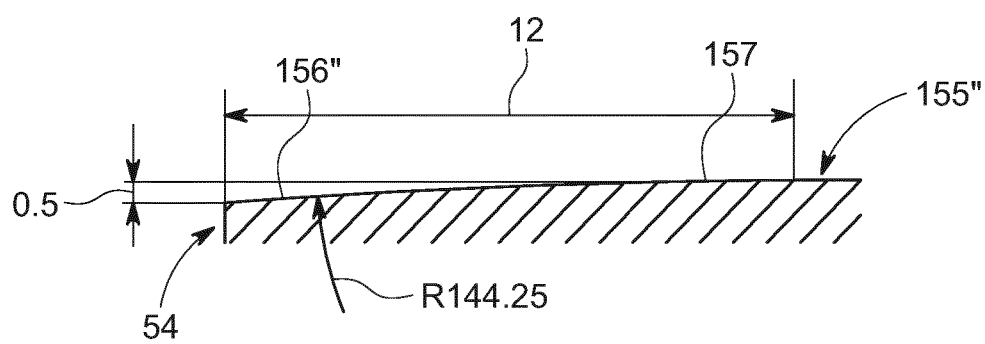
FIG. 10F, in a side sectional view, shows a detail of a profile of a bearing surface of FIG. 10E.

As can be appreciated from FIG. 10F, which is a detailed view of the ledge 156" of FIG. 10E, the removal of material is very minute. Thus, the ledge 156" only forms a very slight angle relative to the internal bearing surface 155".

In practice it has proven very hard to make such ledges 156', 156" or "roundings" without introducing a (microscopic) edge 157 at the boundary between the planar bearing surface 155', 155" and the ledge 156', 156". Even this very small edge 157 is expected to break the oil film between the bearing surfaces and to increase wear on the guide rail pillar 40 or cause locking there between.

Figure 8A:
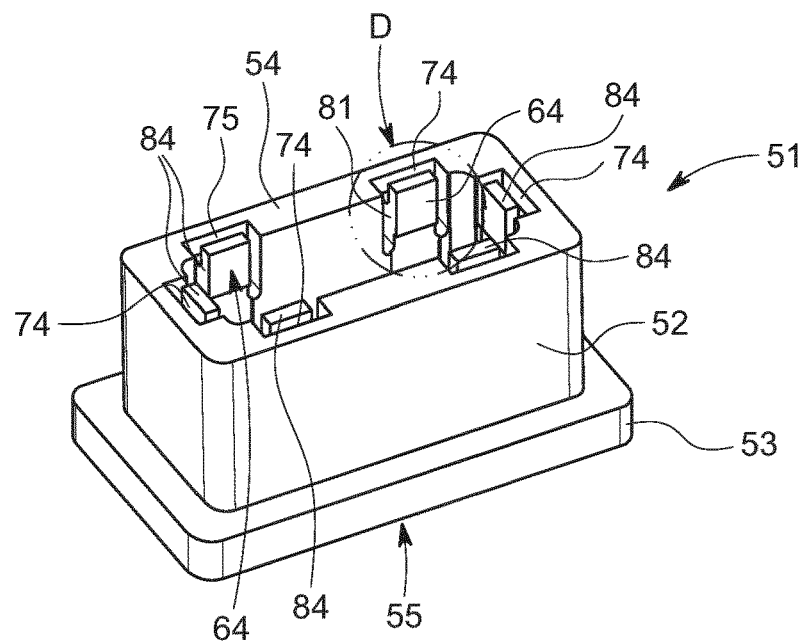
FIG. 8A, in a perspective view, shows a bearing element with integrated bearing surface parts for a bearing according to a second embodiment of the disclosure.
Figure 8B:
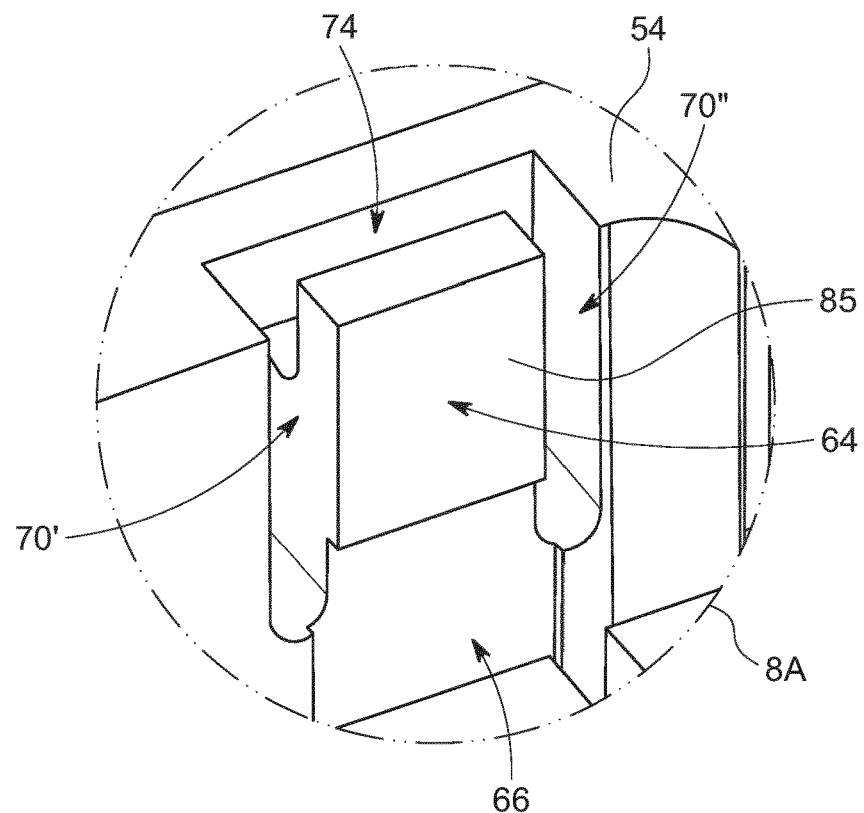
FIG. 8B, shows a detailed view of one integrated bearing surface part of the bearing element of FIG. 8A.
Figures 8C, 8D, 8E:
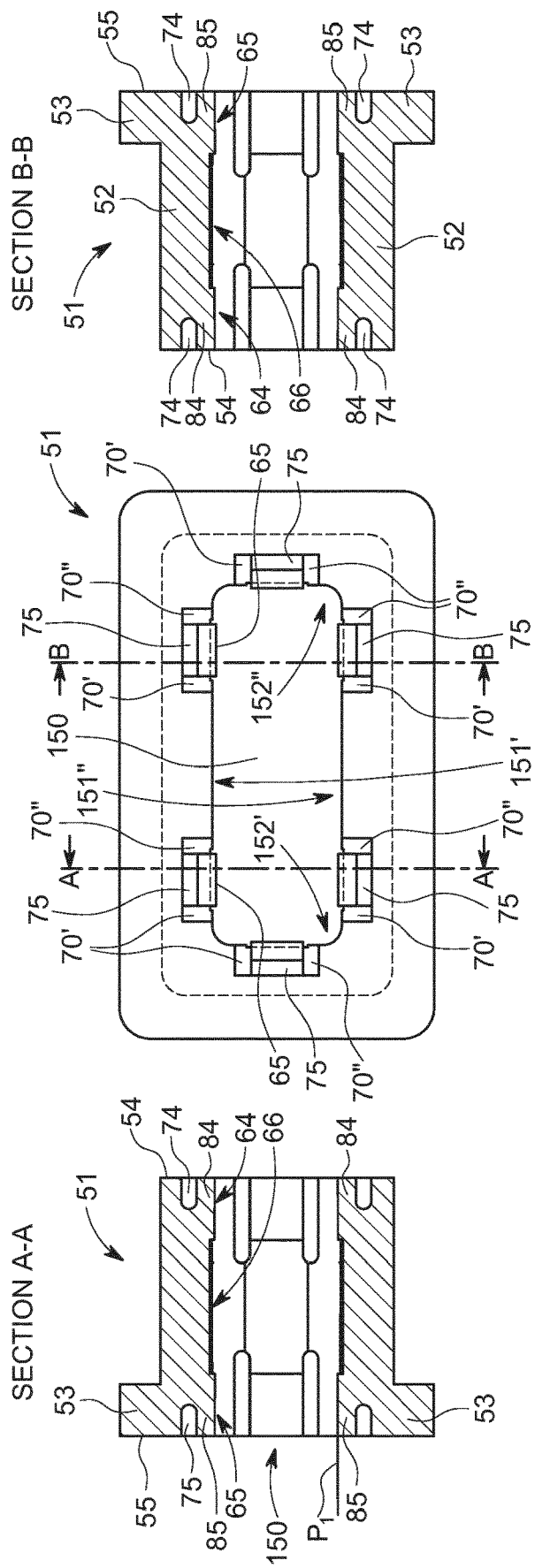
FIG. 8C in a rear view, shows the bearing element of FIG. 8A.
FIG. 8D shows a section A-A though the bearing element FIG. 8C.
FIG. 8E shows a section B-B though the bearing element of FIG. 8C.
Figure 9A:
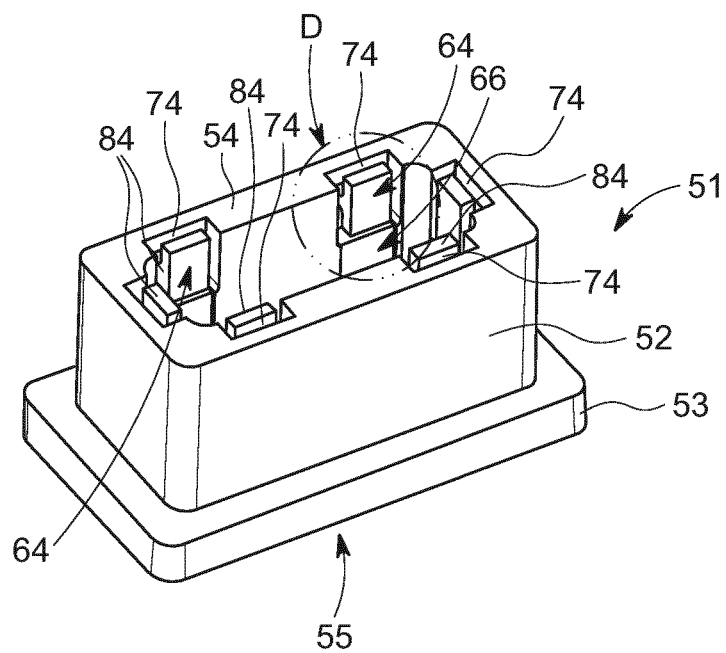
FIG. 9A, in a perspective view, shows a bearing element with alternatively shaped bearing surface parts for a bearing according to a third embodiment of the disclosure.
Figure 9B:
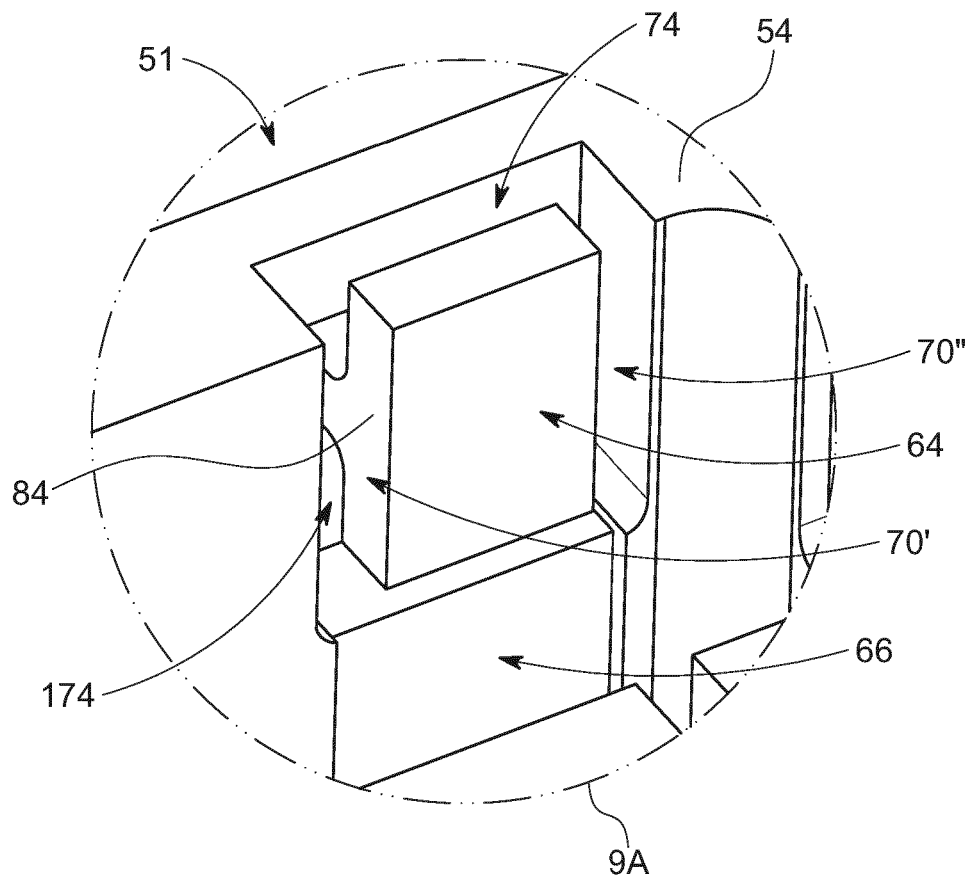
FIG. 9B, shows a detailed view of one integrated bearing surface part of the bearing element of FIG. 9A.

FIGS. 7-9 show embodiments according to a first aspect of the disclosure, which will alleviate the problems of the prior art (FIGS. 6A-C) and of the aspect of the disclosure shown in FIGS. 10A-F.

According to this aspect of the disclosure, the bearing element 51 comprises—for at least one of the guide surfaces 45', 45" of the guide rail pillar 40—a first planar bearing surface 64 and a second planar bearing surface 65 arranged in a common plane $P_1$ (see e.g. FIG. 7E, 8D or 9E) and parallel to the corresponding planar guide surface 45', 45" of the guide rail pillar 40. The first planar bearing surface 64 and the second planar bearing surface 65 are spaced apart in the direction of the longitudinal axis A. The first bearing surface 64 is arranged at the first end 54 of the bearing element 51, and the second bearing surface 65 is arranged at the second end 55 of the bearing element 51. In order to provide a resilience of the first and second bearing surfaces 64, 65 relative to a main body part 52 of the bearing element 51, and thereby ensure that the first and second bearing surface 64, 65 will follow and remain parallel to the corresponding planar guide surface 45', 45" of the guide rail pillar 40 to avoid any edges being the sole contact between the guide rail pillar 40 and the bearing element 50, a cavity 74, 75; 74', 75'; 174, 175 is formed in the bearing element 51 at least partially below each of the first and second planar bearing surfaces 64, 65.

Figure 7A:
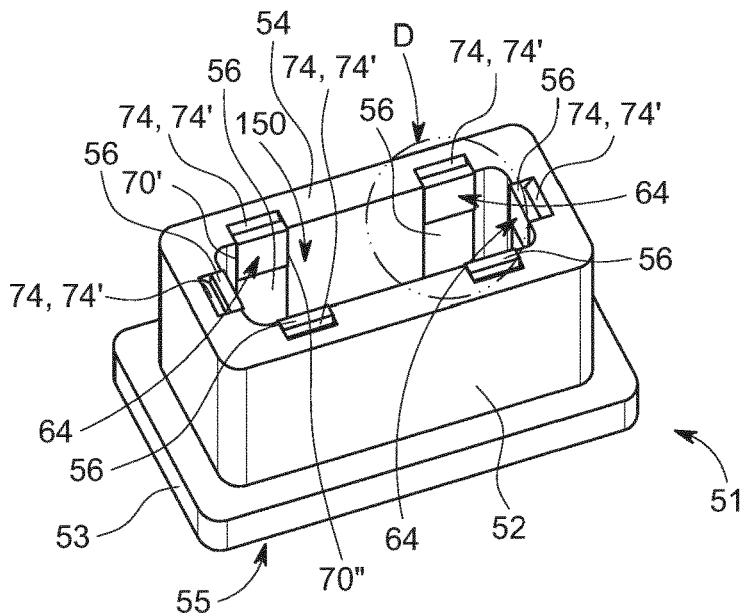
FIG. 7A, in a perspective view, shows a bearing element with separate bearing plate parts for a bearing according to a first embodiment of the disclosure.

Returning now to FIGS. 7A-E, these figures show a first embodiment of the disclosure. FIG. 7A, in a perspective view, shows a bearing element 50 according to the disclosure. The bearing element 51 comprises a main body part 52 with a first end 54 and a second end 55 and a through-going opening 150. The through-going opening 150 is configured for receiving the guide rail pillar 40.

The through-going opening 150 extends from the first end 54 to the second end 55 of the main body part 52, and all the way through the main body part 52.

Thereby, the longitudinal axis A of the guide rail pillar 40 extends in the same direction as the direction from the first end 54 to the second end 55 of the main body part 52.

The bearing element 51 is preferably arranged in an opening 130 through a mold plate, such as a second mold plate 30 of a mold box 1 of an injection molding machine 200 as described above. For this purpose the bearing element 51 may comprise a flange 53 with an increased extent (perpendicular to the longitudinal axis A) relative to the extent of the main body part 52 of bearing element 51 as also mentioned above.

The bearing element 51 forms part of a bearing 50 between planar guide surfaces 45', 45'' of a guide rail pillar 40 of a mold box 1, for example as shown in FIGS. 6A-C, and a second mold plate 30 of the mold box 1, where the second mold plate 30 is moveably arranged on the guide rail 40.

The through-going opening 150 in the embodiment shown in FIGS. 7A-F has four inner surfaces 151', 151'', 152', 152'', see e.g. FIG. 7D.

Preferably, the number of inner surface 151', 151'', 152', 152'' corresponds to the number of planar guide surface 45'.45'' of the guide rail pillar 40.

At least one inner surface 151', 151', 152', 152'' comprises a first planar bearing surface 64 and a second planar bearing surface 65 arranged in a common plane $P_1$, as shown in FIG. 7E, and parallel to the planar guide surface (45', 45''). The first planar bearing surface 64 and the second planar bearing surface 65 are spaced apart in the direction of the longitudinal axis A. The first bearing surface 64 is arranged at the first end 54 and the second bearing surface 65 is arranged at the second end 55 of the bearing element 51.

In the embodiment, shown in FIGS. 7A-F each of the two longer inner surfaces 151', 151'' comprises two sets of such first and second planar bearing surfaces 64, 65, and each of the two shorter inner surfaces 152', 152'' comprises a single set of such first and second planar bearing surfaces 64, 65.

In the shown embodiment, the first and second planar bearing surfaces 64, 65 have a limited width, in a direction perpendicular to the elongate axis A. However, it will be appreciated that the width of the first and second planar bearing surfaces 64, 65 may be varied. Thus, instead of two set of first and second planar bearing surfaces 64, 65 on the two longer inner surfaces 151', 151'', a single set of wider/broader first and second planar bearing surfaces 64, 65 may be used, for example extending the width of the inner surface 151', 151''.

As shown in e.g. FIG. 7D, the first and second bearing surfaces 64, 65 are elevated above the corresponding inner surface 151', 151'', 152', 152'' of the through-going opening 150.

As shown in e.g. FIGS. 7E and F, the first and second bearing surfaces 64, 65 are separated by an intermediary surface portion 66 being retracted from the common plane $P_1$ of the two bearing surfaces 64, 65.

As also mentioned above, a cavity 74, 75; 74', 75'; 174, 175 is formed in the bearing element 51, below each of the first and second bearing surfaces 64, 65, such that a portion 84, 85 of the bearing element 51 is provided with a resilience relative to the main body part 52 of the bearing element 51.

The cavity 74, 74', 174 below the first bearing surface 64 allows the portion 84 (on which the first bearing surface 64 is formed) to flex (at least slightly) relative to the main body part 52 proper, thereby providing the mentioned resilience.

Similarly, the cavity 75, 75', 175 below the second bearing surface 65 allows the portion 85 (on which the second bearing surface 65 is formed) to flex relative to the main body part 52 proper, thereby providing the mentioned resilience.

Generally, the cavity 74; 74'; 174 below the first bearing surface 64 may be formed as a primary cavity 74; 74' extending into the main body part 52 of the bearing element 51 from an end surface at the first end 54 of the bearing element 51. And, generally, the cavity 75; 75'; 175 below the second bearing surface 65 may be formed as a primary cavity 75; 75' extending into the main body part 52 of the bearing element 51 from an end surface at the second end 55 of the bearing element 51.

More specifically and as best illustrated in FIGS. 7E and 7F, the cavity, or primary cavity 74, 75 below each of the first and second bearing surfaces 64, 65 is formed as a ledge 74', 75'.

The ledges 74', 75' may be formed with surfaces angled relative to the inner surface 151', 151'', 152', 152''.

Figure 7B:
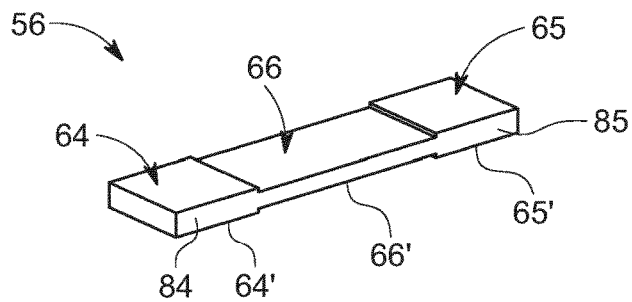
FIG. 7C, shows a detailed view of the bearing plate part arranged in the bearing element of FIG. 7A.
FIG. 7D, in a rear view, shows the bearing element of FIG. 7A.
FIG. 7E shows a section A-A though the bearing element of FIG. 7D.
FIG. 7F shows a section B-B though the bearing element of FIG. 7D.
Figure 7C:
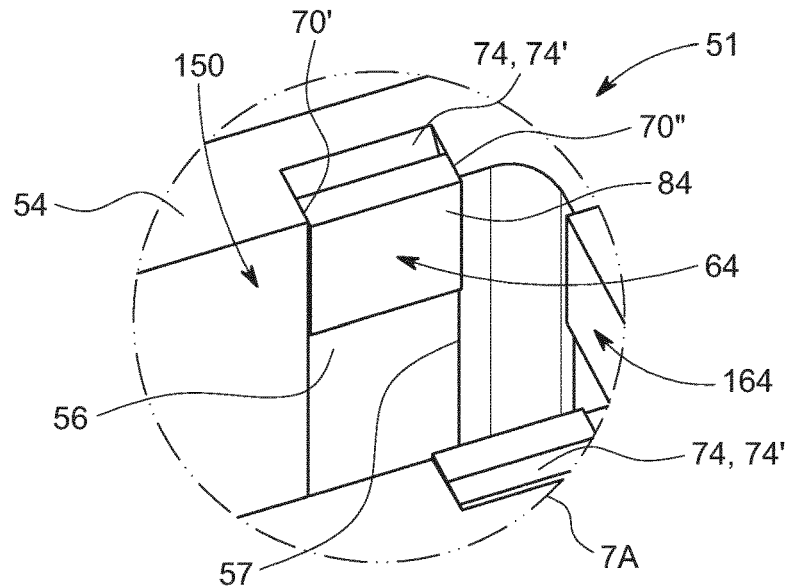

As also shown in FIGS. 7E and 7F, the first and the second bearing surfaces 64, 65 and the intermediary surface portion 66 are formed on a detachable plate member 56. One embodiment of the detachable plate member 56 as such is shown in FIG. 7B.

The detachable plate member 56 is arranged in an elongate depression 57 formed in the inner surface 151', 151'', 152', 152'' of the through-going opening 150 through the bearing element 51.

Preferably, and as shown in the FIGS. 7A-F, the elongate depressions 57 extends from said first end 54 to said second end 55 of the bearing element 51.

Preferably also the detachable plate member(s) 56 is/are configured such that it/they extend(s) from said first end 54 to said second end 55 of the bearing element 51 and fill out the entire length of the elongate depression(s) 57.

It will be appreciated, that in this embodiment, the portions 84, 85 of the bearing element 51 form part of the detachable plate member 56. It will also be appreciated that the portions 84, 85 of the detachable plate member 56 are provided with a resilience relative to the main body part 52 by being able to flex slightly due at least to the cavities 74, 75 formed as the ledges 74', 75' in the bearing element 51.

It will be appreciated that a reverse side of the detachable plate member 56 (reverse relative to the first and the second bearing surfaces 64, 65) may be formed with a single planar surface (not shown).

In other embodiments however, and as shown in e.g. FIG. 7B, the detachable plate member 56, on the reverse side (relative to the first and the second bearing surfaces 64, 65) comprises
a first abutment surface 64';
a second abutment surface 65' formed in a common plane, $P_2$, with the first abutment surface 64'; and
an intermediary surface portion 66' being retracted from the common plane $P_2$ of the two abutment surfaces 64', 65'.

The intermediary surface portion 66 between the first and the second bearing surfaces 64, 65 on one side, and the intermediary surface portion 66' formed between the first and second abutment surfaces 64', 65' on the reverse side the detachable plate member 56, will—in combination allow for a reduced material thickness between the first and the second bearing surfaces 64, 65 which will increase the resilience of the portions 84, 85 of the detachable plate member 56 such that uneven load distribution on the second mold plate 30 will not cause an edge of the bearing element 51 to come into direct contact with the planar surfaces 45.' 45" of the guide rail pillar 40.

The elongate depression 57 formed in at least one of the inner surfaces 151', 151", 152', 152" of the through-going opening 150 through the bearing element 51 may in some (not shown) embodiments be formed with a planar bottom surface extending the entire length of the elongate depression.

However, as is evident from especially FIGS. 7E and 7F, the elongate depression 57 formed in at least one of the inner surfaces 151', 151", 152', 152" of the through-going opening 150 through the bearing element 51, in a preferred embodiment, comprises a first abutment plateau 164 at the second first end 54 of the bearing element 51 a second abutment plateau 165 at the second end 55 of the bearing element 51, and an intermediary depression 166 formed between the first and second abutment plateaus 164, 165.

It will be appreciated that, in embodiments where the elongate depression 57 formed in the inner surface 151', 151", 152', 152" is formed with an even bottomed surface (entirely planar bottom surface), the retracted surface portion 66' forms a void or space between the even bottomed surface and the detachable plate member 56, thereby increasing the flexibility of the bearing 50.

In embodiments, where the elongate depression 57 formed in the inner surface 151', 151", 152', 152" is formed with the first and second abutment plateaus 164, 165 separated by the intermediary depression 166, and the reverse side of the detachable plate member 56, relative to the first and the second bearing surfaces 64, 65, is formed with a single planar surface, a similar void or space is formed between the single planar surface of the detachable plate member 56 and the intermediary depression 166 between the abutment plateaus 164, 165, whereby a similar increased flexibility of the bearing 50 may achieved.

In embodiments, where the elongate depression 57 formed in the inner surface 151', 151", 152', 152" is formed with the first and second abutment plateaus 164, 165 separated by the intermediary depression 166, and where the reverse side of the detachable plate member 56, relative to the first and the second bearing surfaces 64, 65, is formed with retracted surface portion 66' between the first and second abutment surfaces 64', 65', an increased size void or space is formed between the elongate depression 57 and the detachable plate member 56, whereby an increased flexibility of the bearing 50 may achieved.

It is noted that in embodiments, where the elongate depression 57 formed in the inner surface 151', 151', 152', 152" is formed with the first and second abutment plateaus 164, 165 separated by the intermediary depression 166, and where the reverse side of the detachable plate member 56, relative to the first and the second bearing surfaces 64, 65, is formed with retracted surface portion 66' between the first and second abutment surfaces 64', 65', the abutment surfaces 64', 65' and the abutment plateaus 164, 165 are configured for abutting on each other.

It will further be appreciated that (not shown) locking means may keep the detachable plate member 56 locked in the correct position in the elongate depression 57.

FIGS. 8A-E shows another embodiment of the bearing 50, in which the first and second bearing surfaces 64, 65 are not formed on a detachable plate member 56 arranged in an elongate depression 57 as shown in FIGS. 7A-F. Instead, the first and second bearing surfaces 64, 65 are formed on portions 84, 85 formed in the sidewalls, inner surfaces 151', 151", 152', 152", of the bearing element 51. In principle the portions 84, 85 may be formed as (separate) attachable and/or detachable parts relative to the main body part 52 of the bearing element 51. However, in a preferred embodiment, the portions 84, 85 with the respective the first and second bearing surfaces 64, 65 formed thereon, are integrated with the main body part 52 of the bearing element 51.

For example the main body part 52 of the bearing element 51 may be formed in one piece and the portions 84, 85 may be shaped by milling the cavity 74, 75 in the main body part 52. Alternatively, the main body part 52 of the bearing element 51 may be formed in one piece including the cavity 74, 75 defining the portions 84, 85 in an additive manufacturing process.

In such embodiments, the cavity 74 forms a bridge 84' between the main body part 52 as such and the portion 84 on which the first bearing surface 64 is formed. This bridge 84' thereby has a diminished material thickness, which will provide a desired resilience. Similarly, the cavity 75 forms a bridge 85' between the main body part 52 as such and the portion 85 on which the second bearing surface 65 is formed.

In FIGS. 8A-E, the cavity 74; below the first bearing surface 64 is formed as a primary cavity 74, extending into the main body part 52 of the bearing element 51 from an end surface at the first end 54 of the bearing element 51. Further, the cavity 75, below the second bearing surface 65 is formed as a primary cavity 75; 75' extending into the main body part 52 of the bearing element 51 from an end surface at the second end 55 of the bearing element 51.

The cavities 74, 75 extend in the same direction as the longitudinal axis A. The length (in the direction as the longitudinal axis A) of each of the cavities 74, 75 is preferably such that the cavity 74, 75 stretches under half of the first or second bearing surface 64, 65.

As was the case above, also in the FIGS. 8A-E embodiment, the first and second bearing surfaces 64, 65 are separated by an intermediary surface portion 66 being retracted from the common plane $P_1$ of the two bearing surfaces 64, 65. In this case however, the intermediary surface portion 66 may form part of one of the inner surfaces 151, 151", 152', 152".

The first planar bearing surface 64 and the second planar bearing surface 65 are spaced apart in the direction of the longitudinal axis A. The first bearing surface 64 is arranged at the first end 54 and the second bearing surface 65 is arranged at the second end 55 of the bearing element 51.

Also in the embodiment shown in FIGS. 8A-E, each of the two longer inner surfaces 151', 151" comprises two sets of such first and second planar bearing surfaces 64, 65, and each of the two shorter inner surfaces 152', 152" comprises a single set of such first and second planar bearing surfaces 64, 65.

In the shown embodiment the first and second planar bearing surfaces 64, 65 have a limited width, in a direction perpendicular to the elongate axis A.

It will however, be appreciated that the width of the first and second planar bearing surfaces 64, 65 may be varied. Thus, instead of two set of first and second planar bearing surfaces 64, 65 on the two longer inner surfaces 151', 151", a single set of wider/broader first and second planar bearing surfaces 64, 65 may be used, for example extending the width of the inner surface 151', 151".

As shown in e.g. FIGS. 7D and 7E, the first and second bearing surfaces 64, 65 are elevated above the corresponding inner surface 151', 151", 152', 152" of the through-going opening 150.

The embodiment shown in FIGS. 9A-E generally corresponds to the embodiments described in connection with FIGS. 8A-E above. However, in the FIGS. 8A-E embodiment, there is provided an additional secondary cavity 174 below the first bearing surface 64 and additional secondary cavity 175 below the second bearing surface 65.

The additional secondary cavity 174 below the first bearing surface 64 extends into the main body part 52 of the bearing element 51 from the inner surface 151', 151", 152', 152" of the through-going opening 150 from a position adjacent to the first bearing surface 64.

Correspondingly, the additional secondary cavity 175 below the second bearing surface 65 extends into the main body part 52 of the bearing element 51 from the inner surface 151', 151", 152', 152" of the through-going opening 150 from a position adjacent to the second bearing surface 65.

In a further embodiment thereof, and as seen in e.g. FIGS. 9D and 9E, the secondary cavity 174 adjacent to the first bearing surface 64 and the secondary cavity 175 adjacent to the second bearing surface 64 each comprise one first cavity portion 176 extending in a direction perpendicular to a plane of the inner surface 151', 151", 152', 152" of the through-going opening 150, and one second cavity portion 177 extending from the first cavity portion 176 in a direction parallel to the inner surface 151', 151", 152', 152" of the through-going opening 150.

Also in the latter case the portions 84, 85 of the bearing element 51 provided with a resilience relative to the main body part 52 by the cavities 74, 75 formed in the bearing element 51 are formed integral with the main body part 52 of the bearing element 51.

It will be appreciated that even though the FIGS. 9A-E embodiment shows that there is both a primary cavity 74 and a secondary cavity 174 under/below the first bearing surface 74, and both a primary cavity 75 and a secondary cavity 175 under/below the second bearing, in (not shown) embodiment it will—in principle—be possible to have only cavities of the secondary type extending under first and second bearing surfaces 64, 65.

It will be appreciated that also in embodiments, where the portions 84, 85 of the bearing element 51 provided with a resilience relative to the main body part 52 by the secondary 174, 175 formed in the bearing element 51 are formed integral with the main body part 52 of the bearing element 51, the main body part 52 of the bearing element 51 may be formed in one piece and the portions 84, 85 may be shaped by milling the secondary cavity 174, 175. Alternatively, the main body part 52 of the bearing element 51 may be formed in one piece including the secondary cavities 174, 175 defining the portions 84, 85 in an additive manufacturing process.

As shown in FIGS. 8A-E and 9A-E two separations 70', 70" are provided in the bearing element 51 adjacent to each of the first and the second bearing surface 64, 65. The separations 70', 70" extend along a direction parallel to the longitudinal axis A, and in an entire length of the bearing surface 64, 65, and the separations extends from the inner surface 151', 151", 152', 152" of the through-going opening 150 into the main body part 52. In principle the embodiments shown in FIGS. 7A-F also comprises such separations 70', 70", but they are in the shape of the elongate depression 57.

In the latter cases, where the portions 84, 85 are integral with the main body part 53 the portions 84, 85 may be shaped by milling the separations 70', 70" in the main body part 52. Alternatively, the main body part 52 of the bearing element 51 may be formed in one piece including the separations 70', 70" in an additive manufacturing process.

As also mentioned above, a bearing element 51 according to any of the embodiments described may be arranged in an opening 130 through the mold plate 30 of the mold box 1, for example as shown in FIGS. 4B and 5.

Figure 11A:
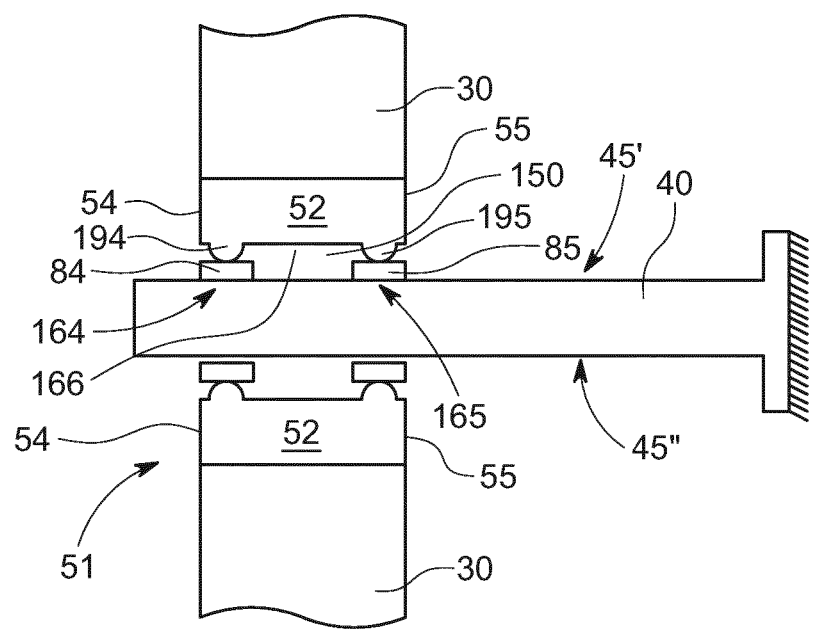
FIG. 11A, in a sectional view, shows a bearing between a guide rail with planar surfaces and a mold plate slidably arranged thereon, a bearing element according to yet another aspect of the disclosure arranged between the guide rail and the mold plate, in a situation where there are no torsional forces on the mold plate or the guide rail.
Figure 11B:
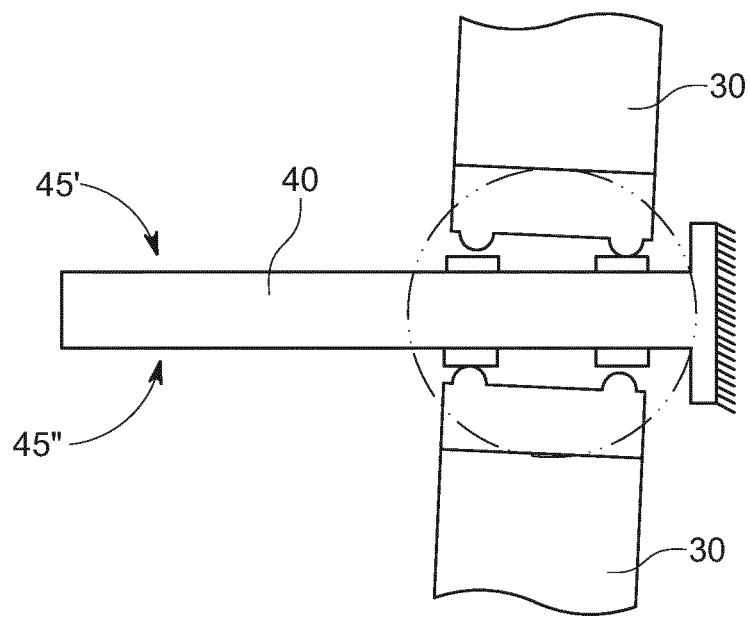
FIG. 11B shows the bearing of FIG. 11A in a situation where the guide rail or the mold plate is subjected to torsional forces.

FIGS. 11A-B illustrates a bearing 50 according to another aspect of the disclosure. The bearing 50 comprises a bearing element 51. The bearing element 51 has a main body part 52 with a first end 54 and a second end 55. The bearing 50 also comprise two detachable bearing plates or portions 84, 85 for each planar surface 45' 45" of the guide rail pillar 40. In principle, the bearing plates or portions 84, 85 may be separate parts individually locked in position relative to the main body part 52 of the bearing element 51 (in the direction of the longitudinal axis A) by (not shown) locking means. However, the bearing plates or portions 84, 85 may also be connected to each other as one integrated part (not shown), for example as the detachable plate 56 described in connection with FIGS. 7A-F. Also in this case the bearing plates or portions 84, 85 may be locked in the correct position relative to the bearing element 51 (in the direction of the longitudinal axis A) by (not shown) locking means. In either case, the bearing plates or portions 84, 85 are connected to the bearing element 51 via semi-cylindrical surfaces 194, 195, one semi-cylindrical surface 194 at the first end 54, and another semi-cylindrical surface 195 at the second end 55.

It is to be noted that the figures and the above description have shown the example embodiments in a simple and schematic manner. Many of the specific mechanical details have not been shown since the person skilled in the art should be familiar with these details and they would just unnecessarily complicate this description.

LIST OF PARTS

1 mold box
10 base plate
15 second end structure of the clamping part/clamping unit
20 first mold plate
21 mold cavity formed in the first mold plate
22 first surface/side of the first mold plate and facing toward the second mold plate
23 second surface/side of the first mold plate opposite to the first surface/side, and facing the base plate
24 upper edge of the first mold plate
25 lower edge of the first mold plate
26 openings through the first mold plate for receiving the cylindrical guide rails in prior art mold boxes
30 second mold plate
31 core formed on second mold plate, and configured for cooperating with the mold cavity of the first mold plate
32 first surface of the second mold plate and facing toward the first mold plate
33 second surface of the second mold plate opposite to the first surface, and facing away from the first mold plate and the base plate
40' guide rail system
40" cylindrical guide rail
40 guide rail pillar
41 elongate body part of guide rail pillar
42 protrusion at end of the elongate body part of the main guide rail pillar 43 first end of guide rail pillar
44 second end of guide rail pillar
45' surface of guide rail pillar
45" surface of guide rail pillar
46' surface of guide rail pillar
46" surface of guide rail pillar
50 bearing between second mold plate and guide rail pillar
51 bearing element
52 main body part of bearing element
53 flange on main body part of bearing element
54 first end of the main body part of bearing element
55 second end of the main body part of bearing element
56 detachable plate member of bearing element
57 elongate depression formed in the inner surface of the through-going opening through the bearing element
64 bearing surface, first bearing surface
64' abutment surface on opposite side of first bearing surface of the detachable plate member of bearing element
65 bearing surface, second bearing surface
65' abutment surface on opposite side of second bearing surface of the detachable plate member of bearing element
66 intermediary surface portion being retracted from a common plane of the first and second bearing surfaces
66' intermediary surface portion being retracted from a common plane of the two abutment surfaces on the opposite sides of the first and the second bearing surfaces of the detachable plate member
70' separation provided in the bearing element adjacent to, and on one side of, each of the first and the second bearing surfaces
70' separation provided in the bearing element adjacent to, and on the other side of, each of the first and the second bearing surfaces
74 cavity, primary cavity formed in the bearing element at first end thereof (first end primary cavity)
74' ledge/angled surface forming the first end primary cavity
75 cavity, primary cavity formed in the bearing element at second end thereof (second end primary cavity)
75' ledge/angled surface forming the second end primary cavity
84 portion of the bearing element at second end thereof, defined by first cavity
85 portion of the bearing element at second end thereof, defined by second cavity
100 molded object
105 plastic granules
120 first opening, opening in/through the first mold plate
121 first section of first opening in/through the first mold plate
122 second section of first opening in/through the first mold plate/enlargement
130 second opening, opening in/through the second mold plate
131 first section of the second opening in/through the second mold plate
132 second section of the second opening in/through the second mold plate
150 third opening, through-going opening/formed through the bearing element
151' inner surface of through-going opening/third opening
151" inner surface of through-going opening/third opening
152' inner surface of through-going opening/third opening
152" inner surface of through-going opening/third opening
155' internal bearing surface
155" internal bearing surface
156' ledge or rounding
156" ledge or rounding
157 edge
164 abutment plateau, first abutment plateau, formed in the elongate depression formed in the inner surface of the through-going opening at a first end of the bearing element
165 abutment plateau, second abutment plateau, formed in the elongate depression formed in the inner surface of the through-going opening at a second first end of the bearing element
166 intermediary depression formed between the first and second abutment plateaus in the elongate depression formed in the inner surface of the through-going opening through the bearing element
174 cavity, secondary cavity (first end secondary cavity) formed in the bearing element at first end thereof
175 cavity, secondary cavity (second end secondary cavity) formed in the bearing element at first end thereof
176 first cavity portion
177 second cavity portion
194 semi-cylindrical surfaces
195 semi-cylindrical surfaces
200 injection molding machine
201 mount/frame of injection molding machine
210 injection unit/injection part of injection molding machine
220 reciprocating screw of injection molding machine
225 nozzle at the entrance to the clamping part of injection molding machine
226 sprue channels in the base plate of the mold box
230 drive mechanism for driving reciprocating screw of injection molding machine
240 hopper of injection molding machine
250 heating devices surrounding the reciprocating screw of the injection molding machine
260 barrel surrounding reciprocating screw of injection molding machine
270 clamping unit/clamping part of injection molding machine
280 linear drive mechanism for linearly displacing the moveable platen and or the second mold plate 30
290 moveable platen
A longitudinal axis of a guide rail pillar
$P_1$ common plane of first and second bearing surfaces

What is claimed is:

1. A bearing between planar guide surfaces of a guide rail pillar of a mold box and a mold plate of the mold box, the mold plate being moveably arranged on the guide rail pillar, the guide rail pillar having a longitudinal axis, the bearing comprising:
a bearing element having a main body part with a first end and a second end and defining a through-going opening for receiving said guide rail pillar, the through-going opening extending from said first end to said second end through said main body part, and the through-going opening having one inner surface for each planar guide surface of the guide rail pillar,
wherein, for at least one of the planar guide surfaces of the guide rail pillar, the bearing element comprises a first planar bearing surface and a second planar bearing surface arranged in a common plane and parallel to at least one of the planar guide surfaces, and spaced apart directionally towards the longitudinal axis, the first planar bearing surface arranged at the first end and the second planar bearing surface arranged at the second end of the bearing element, wherein the first and second planar bearing surfaces are elevated above the corresponding inner surface of the through-going opening, wherein the first and second planar bearing surfaces are separated by an intermediary surface portion being retracted from the common plane of the two planar bearing surfaces, and wherein, below each of the first and second planar bearing surfaces, a cavity is formed in the bearing element, such that a portion of the bearing element is provided with a resilience relative to the main body part of the bearing element.

2. The bearing according to claim 1, wherein the cavity below the first bearing surface comprises a primary cavity extending into the main body part of the bearing element from an end surface at the first end, and wherein the cavity below the second bearing surface comprises a primary cavity extending into the main body part of the bearing element from an end surface at the second end.

3. The bearing according to claim 2, wherein the cavity below each of the first and second bearing surfaces is formed as a ledge.

4. The bearing according to claim 1, wherein the first and the second bearing surfaces and the intermediary surface portion are formed on a detachable plate member, wherein the detachable plate member is arranged in an elongate depression formed in the inner surface of the through-going opening through the bearing element, the elongate depression extending from said first end to said second end of the bearing element.

5. The bearing according to claim 4, wherein the detachable plate member, on a reverse side relative to the first and the second bearing surfaces comprises:

a first abutment surface;

a second abutment surface; and an intermediary surface portion being retracted from a common plane of the first and second abutment surfaces.

6. The bearing according to claim 4, wherein the elongate depression formed in the inner surface of the through-going opening through the bearing element comprises:

a first abutment plateau at the second first end of the bearing element;

a second abutment plateau at the second end of the bearing element, and an intermediary depression formed between the first and second abutment plateaus.

7. The bearing according to claim 1, wherein the cavity below the first bearing surface comprises a secondary cavity extending into the main body part of the bearing element from the inner surface of the through-going opening from a position adjacent to the first bearing surface; and wherein the cavity below the second bearing surface comprises a secondary cavity extending into the main body part of the bearing element from the inner surface of the through-going opening from a position adjacent to the second bearing surface.

8. The bearing according to claim 7, wherein the secondary cavity adjacent to the first bearing surface and the secondary cavity adjacent to the second bearing surface each comprise one first cavity portion extending in a direction perpendicular to a plane of the inner surface of the through-going opening and one second cavity portion extending from the first cavity portion in a direction parallel to the inner surface of the through-going opening.

9. The bearing according to claim 1, wherein the portions of the bearing element provided with a resilience relative to the main body part by the cavities formed in the bearing element are formed integral with the main body part of the bearing element.

10. The bearing according to claim 1, wherein two separations are provided in the bearing element adjacent to each of the first and the second bearing surface, the separations extending along a direction parallel to the longitudinal axis, and in an entire length of the bearing surface, and the separations extending from the inner surface of the through-going opening into the main body part.

11. The bearing according to claim 10, wherein the guide rail pillar comprises two parallel planar guide surfaces and where the bearing element comprises two opposed parallel inner surfaces corresponding to the two parallel planar guide surfaces, and where each of the two opposed parallel inner surfaces comprises at least one set of first and second bearing surfaces.

12. The bearing according to claim 11, wherein the guide rail pillar comprises a first two parallel planar guide surfaces and a second two parallel planar guide surfaces perpendicular to the first two parallel planar guide surfaces, and where the bearing element comprise a first two opposed parallel inner surfaces corresponding to the first two parallel planar guide surfaces, and a second two opposed parallel inner surfaces corresponding to the second two parallel planar guide surfaces, and where each of the parallel inner surfaces comprises at least one set of first and second bearing surfaces.

13. The bearing according to claim 1, wherein the bearing element is arranged in an opening through the movable mold plate of the mold box.

14. A bearing assembly configured for disposal between planar guide surfaces of a guide rail pillar of a mold box and a mold plate of the mold box, the mold plate being moveably arranged on the guide rail pillar, the guide rail pillar having a longitudinal axis, the bearing assembly comprising:

a bearing element having:

a main body defining: an opening extending between a first end and a second end of the main body, the opening for receiving said guide rail pillar, the main body having an inner surface for each planar guide surface of the guide rail pillar, a first planar bearing surface and a second planar bearing surface arranged in a common plane and parallel to at least one of the planar guide surfaces and spaced apart directionally towards the longitudinal axis, the first planar bearing surface arranged at the first end and the second planar bearing surface arranged at the second end of the bearing element, the first and second planar bearing surfaces are elevated above the corresponding inner surface of the opening, and the first and second planar bearing surfaces are separated by an intermediary surface portion being retracted from the common plane of the two planar bearing surfaces, and a cavity formed in the bearing element below each of the first and second planar bearing surfaces, a portion of the bearing element is provided with a resilience relative to the main body of the bearing element.

15. A mold box for an injection molding machine, the mold box comprising:

a first mold plate;

a second mold plate;

a guide rail system having planar guide surfaces and a guide rail pillar having a longitudinal axis, the guide rail system configured for guiding one of the first or second mold plates linearly away from or towards the other of the first or second mold plate;

a bearing element having:
- a main body defining: an opening extending between a first end and a second end of the main body, the opening for receiving said guide rail pillar, the main body having an inner surface for each planar guide surface of the guide rail pillar,
- a first planar bearing surface and a second planar bearing surface arranged in a common plane and parallel to at least one of the first or second mold plate and spaced apart directionally towards the longitudinal axis, the first planar bearing surface arranged at the first end and the second planar bearing surface arranged at the second end of the bearing element, the first and second planar bearing surfaces are elevated above the corresponding inner surface of the opening, and the first and second planar bearing surfaces are separated by an intermediary surface portion being retracted from the common plane of the two planar bearing surfaces; and
- a cavity formed in the bearing element below each of the first and second planar bearing surfaces, a portion of the bearing element is provided with a resilience relative to the main body of the bearing element.

* * * * *